United States Patent [19]
Bollman et al.

[11] Patent Number: 6,141,012
[45] Date of Patent: Oct. 31, 2000

[54] IMAGE PROCESSING CODE GENERATION BASED ON STRUCTURED IMAGE (SI) TECHNIQUES

[75] Inventors: James E. Bollman, Williamson; Dennis L. Venable, Marion; Michael R. Campanelli, Webster; William A. Fuss, Rochester, all of N.Y.

[73] Assignee: Xerox Corporation, Stamford, Conn.

[21] Appl. No.: 08/829,385

[22] Filed: Mar. 31, 1997

[51] Int. Cl.[7] ................................................ G06T 9/00
[52] U.S. Cl. ............................................ 345/418; 345/522
[58] Field of Search .................................. 345/418, 433, 345/441, 522

[56] References Cited

U.S. PATENT DOCUMENTS

| | | | |
|---|---|---|---|
| 5,485,568 | 1/1996 | Venable et al. | 707/500 |
| 5,557,795 | 9/1996 | Venable | 395/650 |
| 5,666,503 | 9/1997 | Campanelli et al. | 345/356 |
| 5,675,801 | 10/1997 | Lindsey | 395/702 |
| 5,734,908 | 3/1998 | Chan et al. | 395/709 |
| 5,754,858 | 5/1998 | Broman et al. | 395/701 |
| 5,767,978 | 6/1998 | Revankar et al. | 358/296 |
| 5,809,179 | 9/1998 | Marimont et al. | 382/254 |
| 5,875,331 | 2/1999 | Lindsey | 395/702 |

OTHER PUBLICATIONS

US patent application Ser. No.: 08/553232 entitled "Structured Image (SI) Format For Describing Complex Color Raster Images", filed Nov. 7, 1995 by Dennis L. Venable et al.

IEEE Computer Graphics & Applications Journal, Mar. 1991, pages 71–78, "Constructive Page Description" by J. Schonhut, H Wiedling and V. Samara.

*Primary Examiner*—Mark K. Zimmerman
*Assistant Examiner*—Albert K. Lee

[57] ABSTRACT

A scheme that generates image processing source code for custom applications automatically by using structured image (SI) technology in a way that takes advantage of the unbound and incomplete features of SI. Resulting custom applications developed by this method can be defined and converted to running source code in minutes, or shipped to a co-user of the system in a compact portable form for remote code generation.

Nested sub-component references and associated image processing operations necessary to generate an output raster image are obtained from a structured image template. Image processing operations and the order of said operations within an image processing definition are stored within the structured image definition. Unbound structured image references to undefined component objects and incomplete structured image references to image processing operations and parameters not explicitly defined within said structured image are input options. Source code is generated from structured image definition language automatically utilizing a modified structured image render program which analyzes said structured image definition language. The code can be used for further rendering or code modification activities.

1 Claim, 22 Drawing Sheets

```
#!SIDL-1.1
#0000
#Copyright:(c)  1993 Xerox
Corp.
#Creator: John Doe
#Created: 27-05-93 21:00:00
EDT
#Revision:1.0.0
#Root:SI-Example
EndHeader Object: SI-Example = {
    IPD = $ipd1 ;
    };

IPD: ipd1 = {
    AspectRatio = 0.7727 ;
    DefaultWidth = 11in ;
    FitMode = FitInside ;
    Justification = Center ;
    Angle = 0.0 ;
    Merge = $merge1;
    Merge = $merge2;
    Merge = $merge3;
    Merge = $merge4;
    };

Merge: merge1 = {
    MergePoint = 0.0 0.0;
    Path = $path1;
    };

Merge: merge2 = {
    MergePoint = 0.4 0.2;
    Path = $path2;
    };

Merge: merge3 = {
    MergePoint = 0.3 0.3;
    Path = $path3;
    };

Merge: merge4= {
    MergePoint = 0.1 0.1;
    Path = $path4;
    };
```

*FIG. 19*

```
Path: path1 = {
    Object = $mount1;
    Size = 1.0 1.0;
    ControlPoint = 0.0 0.0;
    IPO: 1 = {
       IPOName = Enhance;
       };
    };

Object: mount1 = {
    External = {
       System = "unix";
       Name = "mount.tif";
       };
    };

Path: path2 = {
    Object = $text1;
    Size = 0.6 0.3;
    ControlPoint = 0.0 0.0;
    };

Object: text1 = {
    External = {
       System = "unix";
       Name = "sample.toytext";
       };
    };

Path: path3 = {
    Object = $home;
    Size = 0.7 0.6;
    ControlPoint = 0.0 0.0;
    };

Object: home = {
    External = {
       System = "unix";
       Name = "house_tree.sid";
       };
    };
```

*FIG. 20*

```
Path: path4 = {
    Object = $bird1;
    Size = 0.2 0.3;
    ControlPoint = 0.0 0.0;

IPO: 1 = {
       IPOName = Crop;
       Window = 0.2 0.0
       0.8 0.7;
       };

IPO: 2 = {
       IPOName = ColorAdjust;
       Hue = 0.9;
       Chroma = 0.5;
       };

IPO: 3 = {
       IPOName =
            SpatialTransform;
       Operation = Scale;
       Param = 1.2;
       };
    };
Object: bird1 = {
    External = {
      System = "unix";
      Name = "bird.ras";
      };
    };
```

```
#MR-1.0

representation = {
    format = "sunras";
    attribute = {
        dpi = 200;
        };
    data =
    "/image/bird.small.ras";
    };
representation = {
    format = "sunras";
    attribute = {
        dpi = 400;
        };
    data =
    "/image/bird.larger.ras";
    };
representation = {
    format = "TIFF";
    attribute = {
```

```
#!SIDL-1.1
#0000
#Copyright:(c)  1993 Xerox Corp.
#Creator: John Doe
#Created: 17-03-97 21:00:00 EDT
#Revision:1.0.0
#Root:SICodeGenEx
EndHeader SID: SICodeGenEx = {
    DefaultWidth = 7.0in ;
    DefaultResolution = 300 ;
    Aspect Ratio = 1.0 ;
    Pasteboard = {
        Color = "255 255 255" ;
        Opacity = 1.0 ;
        };
    Representation = {
        Format = IPD ;
        Data = {
            Merge = $merge1 ;
            Merge = $merge2 ;
            Merge = $merge3 ;
            Merge = $merge4 ;
            };
        };
    };

Merge: merge1 = {
    MergePoint = 0.0 0.0 ;
    Path = {
        Object = {
            Size = 1.0 1.0 ;
            SID = {
                Representation = {
                    Format = Raster ;
                    Data = "mount.tif" ;
                    };
                };
            };
        IPO = Enhance ;
        };
    };
```

FIG. 27

```
Merge: merge2 = {
    MergePoint = 0.1 0.1 ;
    Path = {
        Object = {
            Size = 0.5 0.1 ;
            SID = {
                Representation = {
                    Format = ToyText ;
                    Data = $name ;
                };
            };
        };
    };
};

Merge: merge3 = {
    MergePoint = 0.5 0.5 ;
    Path = {
        Object = {
            Size = 0.4 0.4 ;
            SID = {
                Representation = {
                    Format = Raster ;
                    Data = $image ;
                };
            };
        };
        IPO = Crop { Window = "0.2 0.0
        0.8 0.7" ; };
        IPO = ColorAdjust { Hue = 0.9 ;
        Chroma = 0.5 ; };
    };
};

Merge: merge4 = {
    MergePoint = 0.25 0.45 ;
    Path = {
        Object = {
            Size = 0.2 0.5 ;
            SID = {
                Representation = {
                    Format = Raster ;
                    Data = "pine_tre.tif" ;
                };
            };
        };
    };
};
```

*FIG. 28*

IMAGE PROCESSING CODE GENERATION BASED ON STRUCTURED IMAGE (SI) TECHNIQUES

CROSS REFERENCE

Cross reference is made to the following U.S. Patents and co-pending patent application assigned to the same assignee as the present application, and herein incorporated by reference into this disclosure: U.S. Pat. No. 5,485,568, entitled "Structured Image (SI) Format For Describing Complex Color Raster Images" issued Jan. 16, 1996 to Venable et al.; U.S. Pat. No. 5,557,795, entitled "Pipelined Image Processing System For A Single Application Environment" issued Sep. 17, 1996 to Venable; and U.S. patent application Ser. No. 08/553,232 entitled "Structured Image (SI) Format For Describing Complex Color Raster Images", filed Nov. 7, 1995 by Dennis L. Venable et al.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

1. Field of the Invention

The invention is generally related to function assemblers and source code generation for image processing applications and, more particularly, to a system and method that generates image processing source code for custom image processing applications automatically using the unbound and incomplete features of structured images whereby custom applications developed can be defined and converted to re-editable running source code in a compact portable form for remote code generation, customization and enhancement, automatic image assembly and high performance imaging using an appropriate user interface.

2. Background of the Invention

There exists a strong industry interest in structured document theory and how this technology can affect products and services. Current structured document theory considers a raster image as a simple content block with no hierarchical nature or image processing operations associated with it. For a page oriented description, see IEEE Computer Graphics & Applications Journal, March 1991, pages 71–78, "Constructive Page Description," by J. Schonhut, H. Wiedling and V. Samara. For a general description of structured documents, see "Structured Documents", by J. Andre, R. Furuta and V. Quint, Cambridge Series on Electronic Publishing, 1989.

Structured Image (also referred to as "SI" throughout this disclosure) technology is a base technology capable of addressing the entire gamut of: object acquisition, storage, edit/preparation and delivery/transmit to output rendering. As discussed in a publication by Venable et al., "Structured Images", Electronic Imaging, SPIE/IS&T International Technical Working Group Newsletter, Vol. 5, No. 2, July 1995, and in U.S. Pat. No. 5,485,568 to Venable et al., an SI is a hierarchical description of a single output image raster which may be used as one component of a page in a structured document. Such a model has implications not only in the image editing and processing area, but also in the filling and printing services used for image handling technology. Present applications of SIs are aimed at representing a raster image as a collection of objects in a device independent format. An SI is composed of multiple, nested sub-components and the image processing necessary to generate the output raster image. Objects contributing to the output raster may originate from text, graphics, other rasters, and other SIs. SI sub-components maintain their heritage for selectability and modification. SI technology is an enabler for the quick-and-easy creation of complex color images and manipulation of personalized images, as well as customized image assembly for image manufacturing. An SI expands the scope of a complex raster image into a collection of individually manipulable objects and processing operations. SI specification supports a device-independent (size, resolution, color, etc.,) representation of images. SI technology provides the capability for automatic image assembly, customization and enhancement, and high performance imaging (parallel, distributed, caching, etc.).

An SI, in its simplest form, is described by a set of representations and a pasteboard. Representations specify the content of the SI; the pasteboard specifies the "frame" of the SI. The concept of multiple raster representations is understood in the art and is currently in use in several available applications. With SI, however the idea of multiple representations is expanded to include non-raster data such as text, graphics and image composites which specify the image processing and merging of multiple component objects. Component objects such as text and graphics are stored in their native format for editability. The requirement of a valid representation is that it be renderable into raster form, and that all representations of a single SI have the same "look" when rendered (i.e., all representations must have an essentially similar appearance). They may have different dimensions or encodings but must clearly be renderings of the same image. More specifically, an SI is an object composed of a hierarchical collection of sub-objects and associated raster processing operations. An object represents the type of data that can be rendered into a raster format utilizing an appropriate rendering procedure. A SI image is defined as an object which is a representation of data that can be rendered into a raster image. Associated with the object is the pasteboard (frame) for the object to be rendered onto. An SI does not require an absolute size to be specified within the SI description—image parameters are specified during image rendering. To convert an SI object into a raster image, the rendering procedure is invoked with the object, pasteboard, and absolute dimensions of the parent object as parameters. The SI object and any child objects will be rendered to the proper output size automatically.

SI data may represent simple raster images such as TIFF files, or more complicated data such as a hierarchical collection of sub-objects and associated raster processing operations. The list of supported object types and imaging processing operations is not restricted. SI objects may originate from any data, can be converted into a raster image, such as ASCII strings, CGM graphics, TIFF images, PhotoCD images, and even other SIs. SI data types include: raster images (TIFF, RES, etc.); text (simple text annotations); SGMs (simple graphical annotation); IPDs (image processing description combining sub-objects and image processing operations); MR files (files containing a description of multiple image representations); or other objects not yet defined.

An important characteristic of SI technology is the ability to store image processing operations within the SI image definition. The object data type Image Processing Definition (IPD) provides the mechanism for storing image processing operations. IPD enables an SI to be composed of other SIs with image processing operations. The IPD representation allows SIs to be read as component objects and merged onto the pasteboard. Image processing operations on the rendered object and the processed component images' merger onto pasteboard are ordered.

SI technology supports the concept of a raster image that is not completely defined. It is permissible to create an SI that refers to an undefined component object. At render-time, the undefined component object must be resolved for a raster image to be generated. An SI containing a reference to an undefined component object is known as "unbound." Similarly, an SI may reference an image processing operation or parameter not explicitly defined within the SI. Again, this reference must be resolved at render-time. Such an operation or parameter is called "incomplete." Unbound or incomplete SIs were envisioned to enable the creation of templates for automatic image assembly. Unbound and incomplete images are valid SIs which require additional information for proper rendering. Once the additional information is provided, the SI is processed into a final raster and then rendered. Once processed or rendered an image must under go lengthy programming to be customized and regenerated.

Industry has not addressed the need for simplified manipulation of structured documents or SIs through pre-rendering code generation techniques. To support custom and standard imaging needs within custom image processing programs, a method is therefore needed to generate stand alone solutions that do not require lengthy programming. Currently, SI files are written out in SIDL (Structured Image Definition Language) that has been specifically designed for SIs. This language exhibits characteristics useful for SI processing. For example, the structure evident within an SI is maintained. The well defined organization of image processing operations and render procedures are part of the language and may be useful in optimizing the processing operations. An SI render program analyzes the SIDL and generates the appropriate image processing calls, such as described in U.S. Pat. No. 5,557,795 to Venable, necessary to render the output raster. To support custom and standard imaging needs within custom image processing programs, a method is therefore needed to generate stand alone SI editing solutions.

Therefore, it is an object of the invention to provide a method for automatically developing useful image processing code based on unbound and incomplete structured image information using available SI related language and using available image processing protocols.

It is another object of the invention to provide a method for automatically developing useful image processing code based on unbound and incomplete structured image information where appropriate image processing calls, such as the XTIP, are utilized.

It is yet another object of the invention to provide a method automatically developing useful image processing code based on unbound and incomplete structured image information using extensions of the SID whereby the user of this code generator could be prompted to supply operational documentation at creation time with low level references added automatically by the code generator based on what calls were assembled.

It is yet another object of the invention to provide a method for automatically developing useful image processing code based on unbound and incomplete structured image information whereby stand alone image processing solutions are developed that do not require lengthy programming.

All of the references cited herein are incorporated by reference for their teachings.

SUMMARY OF THE INVENTION

In order to achieve the foregoing and other objects, and to overcome the shortcomings discussed above, an SI code generation process is defined which, in its simplest form, is described by a set of objects and their representation on a pasteboard, and by examples of simplified code generated from the representation of objects on the pasteboard together with each objects pathway onto the pasteboard and specified parameters for each objects representation. The invention is a method and system that generates image processing code for custom applications automatically using the unbound and incomplete features of SI technology. Taking advantage of the unbound and incomplete aspects of the SI technology gives rise to an extension of SI technology whereby the Structured Image Definition (SID) does not have to only describe an output image raster. If all input images are undefined (unbound) and a subset of the image processing variables are not defined (incomplete), the SID could be thought of as a description of an image processing tasks rather than an output raster. An SI render program can be modified to generate source code describing the image processing operations involved in the unbound incomplete SID. With extensions of the SID the user of this code generator can be provided operational documentation at creation time with low level reference added automatically by the code generator based on what calls are assembled. The structured image code generator system comprises a microprocessor programmed to: generate at least one structured image raster capable of being rendered, wherein said at least one structured image raster is generated as a result of zero or more image processing operations being performed on zero or more structured image objects and a SID which describes structured image formation processes used to generate said at least one structured image raster; and to generate structured image code instantaneously in response to computer instructions and operator inputted commands wherein said code is based on information read by said microprocessor from said structured image processing means. A memory provides computer instructions, structured image objects and SID to the microprocessor. The SID further comprises zero or more interconnected image processing operations performed on said zero or more structured image objects and which is merged with said one or more structured image objects to form said at least one structured image raster. A user interface is used to accepted operator inputted commands to the microprocessor during the code generation process.

The method for generating re-editable image processing requires obtaining from a structured image, nested sub-component references and associated image processing operations necessary to generate an output raster image. Image processing operations and their order of operation are stored within an IPD. Unbound structured image references to undefined component objects and incomplete structured image references to image processing operations and parameters not explicitly defined within said structured image are determined. A template is generated based on said unbound and said incomplete structured image references wherein the template comprises pre-rendering code. The template is stored in memory for manipulation of structured images through pre-rendering code techniques. The template is compiled into a structured image definition language and code is then developed utilizing a modified structured image render program which analyzes said structured image definition language.

The advantages of the invention are that SID files are small in comparison to the code generated, and in plain text so they could be distributed to users of the system by electronic mail quickly. A complete image processing package could consist of the base library, a code generator and a set of SID files that could be expanded on the host system.

Near zero development time would be required for custom processed modules with the performance of hand coding. Self documenting code provides fast delivery. At creation of the custom module, the documentation for usage could be entered and the details would be extracted from the library documentation at code generation time. An interactive model modified to create these special incomplete unbound SID fields would allow an end user or a solution center to generate useful custom code within minutes. The resulting code requires minimal memory and can be transferred through electronic mail means. Custom applications developed by this method can be defined and converted to running code in minutes, or shipped to a co-user of the system in a compact portable form for remote code generation.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 8A shows the unrotated pasteboard and FIG. 8B shows the rotated pasteboard;

FIGS. 19–22 provide the SID files associated with the top level SI shown in FIG. 18;

FIG. 27–28 provide the SID files associated with the top level SI shown in FIG. 25.

DETAILED DESCRIPTION OF THE PREFERRED EMBODIMENT

In order to fully teach the invention, a detailed description of structured image technology is necessary to include: defining Structured Images, SI objects, pasteboards, ReadObjects, Finder Functions, Image Processing Definition (IPD) format, unbound/incomplete SIs, object-oriented rendering, Processing-Tree rendering, MR file format, SpatialTransform Image Processing Operation (IPOs), and SI generation examples. SI code generation will then be described and better understood with a detailed description of the foregoing listed topics.

A. STRUCTURED IMAGES

A1. Structured Imaging Defined

An SI is defined by an "object" which is a representation of data that can be rendered into a raster image, and a "pasteboard" that represents a "frame" for the object to be rendered onto. An SI does not have absolute size specified within the SI description. The size of each sub-object is stored within the pasteboard as a size relative to the sub-object's parent.

To convert an SI object into a raster image, the ReadObject rendering procedure, see below, is invoked through appropriate command instructions using, for example, user input device, with the object, pasteboard, and absolute dimensions of the parent object as parameters. The SI object and any child objects will be rendered to the proper output size automatically. An SI is described by a Structured Image Definition (SID) file.

Figure 1:
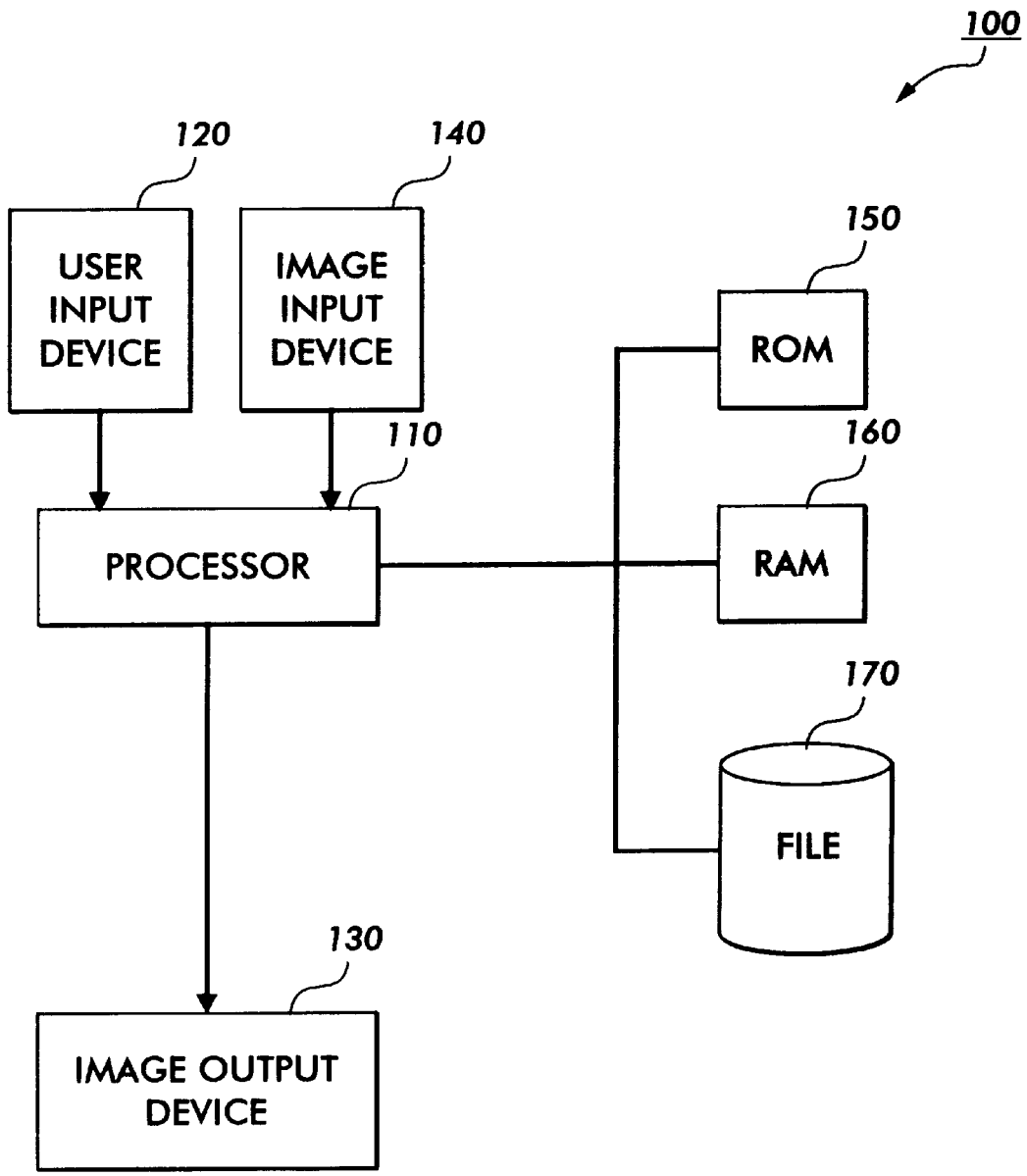
FIG. 1 is a block diagram showing general components that can be used with the invention.

It should also be understood that an SI object may be automatically scanned into the SID using appropriate SI scanning software and typical hardware configurations such as scanner represented by a user input device 120 in FIG. 1. FIG. 1 is a block diagram showing general components that can be used with the invention. Thus, interactive editing is by no means the only method of creating or preparing a SID for printing.

A2. Structured Image Object

Figure 2:
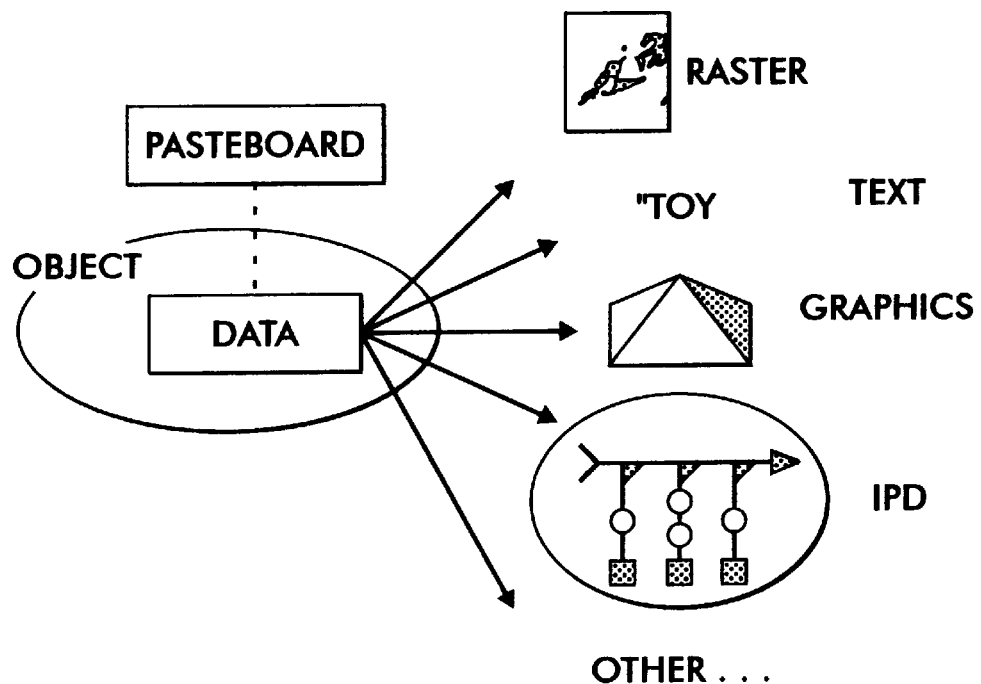
FIG. 2 is a graphic representation showing the variety of data types that make up an SI object.

Referring to FIG. 2, An SI object is a representation of data that can be rendered into a raster image. This data may represent simple raster images, such as, TIFF files, or more complicated data such as a hierarchical collection of sub-objects and associated raster processing operations. Possible object data types include:

1) raster image—TIFF, RES, or other digital display, 2) toy text—simple text annotation, 3) CGM graphics—simple graphical annotation, 4) IPD—SI image processing description, 5) MR file—file containing a description of multiple image representations.

An important feature of SI technology is the ability to store image processing operations (IPOs) within the SID. The object data type IPD provides the mechanism for storing IPOs, as will be discussed in greater detail below.

Figure 3:
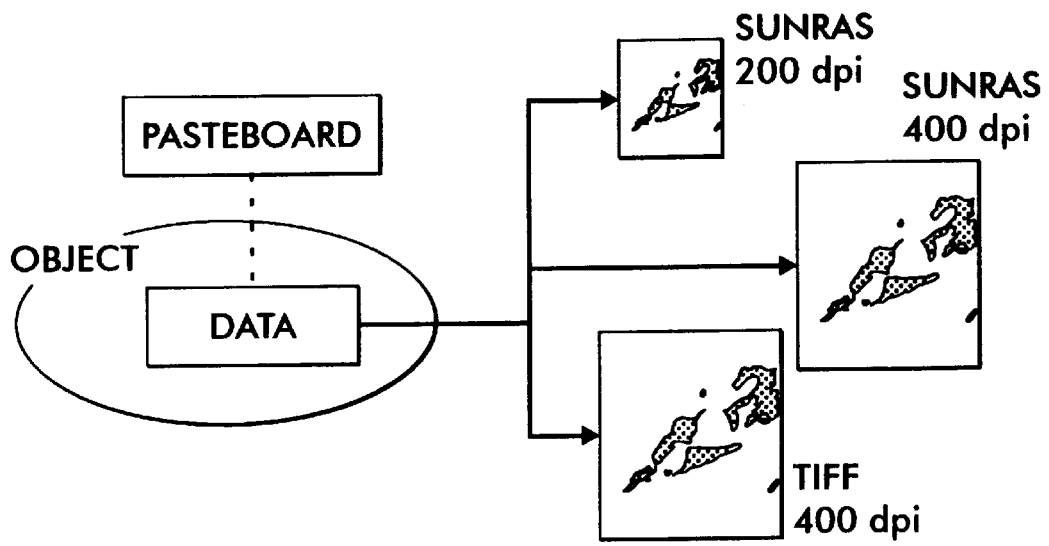
FIG. 3 is a graphic representation showing an example of the Multiple Representations (MR) that make up an SI object.

A single SI object may represent more than one data type and/or data file. For example, referring to FIG. 3, a single SI object may reference a directory containing several TIFF files stored at different resolutions. Each TIFF file represents the same image, but has different absolute pixel dimensions and photometry. This concept is known as multiple representations (MR). SI specifies multiple representations to be determined dynamically, but the MR file format is defined for those applications that require explicit specifications of multiple representations (as will be described below).

The topmost object in an SI, i.e., the object which has no parent, is called the root object. This will be described in greater detail in the discussion of the object rendering process below.

A3. Pasteboard

The pasteboard is the "frame" into which SI objects are rendered. Several attributes can be specified within the pasteboard (see FIG. 3): 1) RelativeSize; 2) Angle; 3) FitMode; 4) Justification; and 5) ControlPoint.

The pasteboard specifies the size of the rendered object relative to its parent object. For example, the pasteboard applied to a sub-object may specify a size such as (1.0,0.5) relative to the parent object, where (1.0,0.5)=width and height ratios. At render time, if the parent is specified to render at (1000×2000) pixels, the sub-object would be rendered at (1000×1000) pixels since the pasteboard dimension specified that the subobject to render at the full width but half the height. The default relative size is (1.0,1.0).

Figure 4:
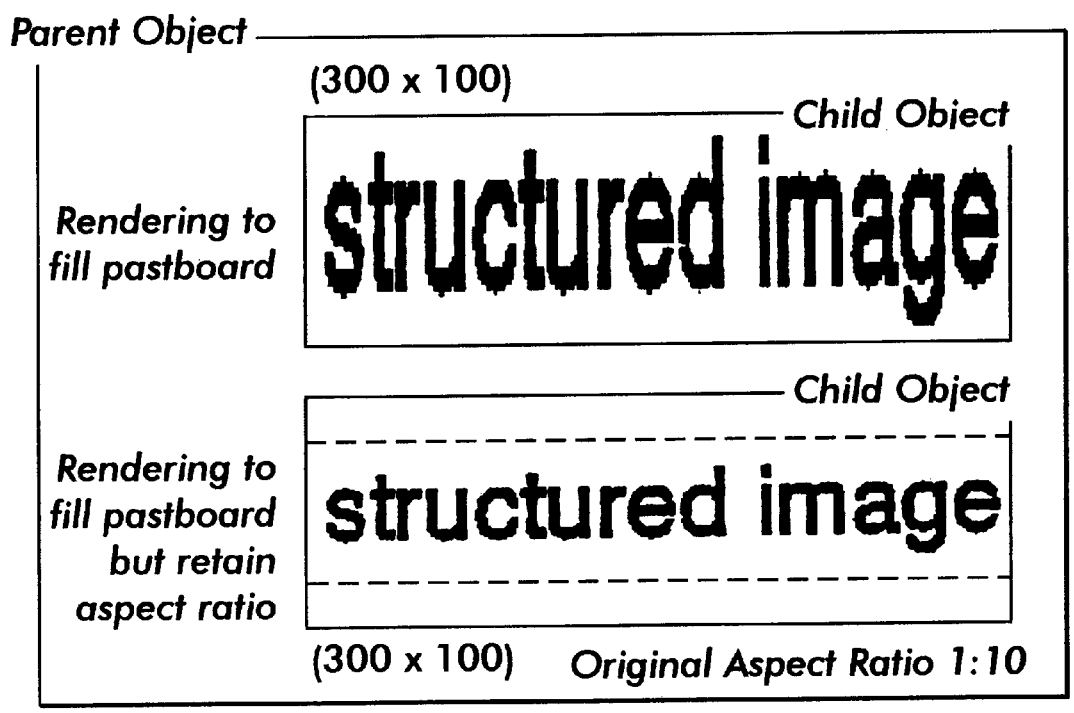
FIG. 4 is a graphic representation showing rendering to maintain the Aspect Ratio.

When rendering an SI, relative size of the pasteboard is used to determine the absolute size of the pasteboard based on the absolute size of the parent object (see FIG. 4). However, for reasons of optimal quality rendering, it may be preferable to have the child object render to different absolute dimensions than the dimensions determined by the pasteboard and parent size. For example, consider the child object to be a TIFF file of scanned text with an aspect ratio of 10 to 1 (width to height). Consider the associated pasteboard to have a relative size of (0.67,0.33). Let the parent object be rendered to an absolute size of (450×300) pixels. Therefore, the child pasteboard has an absolute size of (300×100). If the TIFF file were scaled to fit this window, it would be stretched by a factor of 3 in the y- direction, which would greatly distort the text. In this case, it might be preferable to render the text in the original aspect ratio to fit the desired pasteboard, the TIFF file might be scaled to dimensions (300×30) to maintain the 10 to 1 aspect ratio (width to height).

Figure 5:
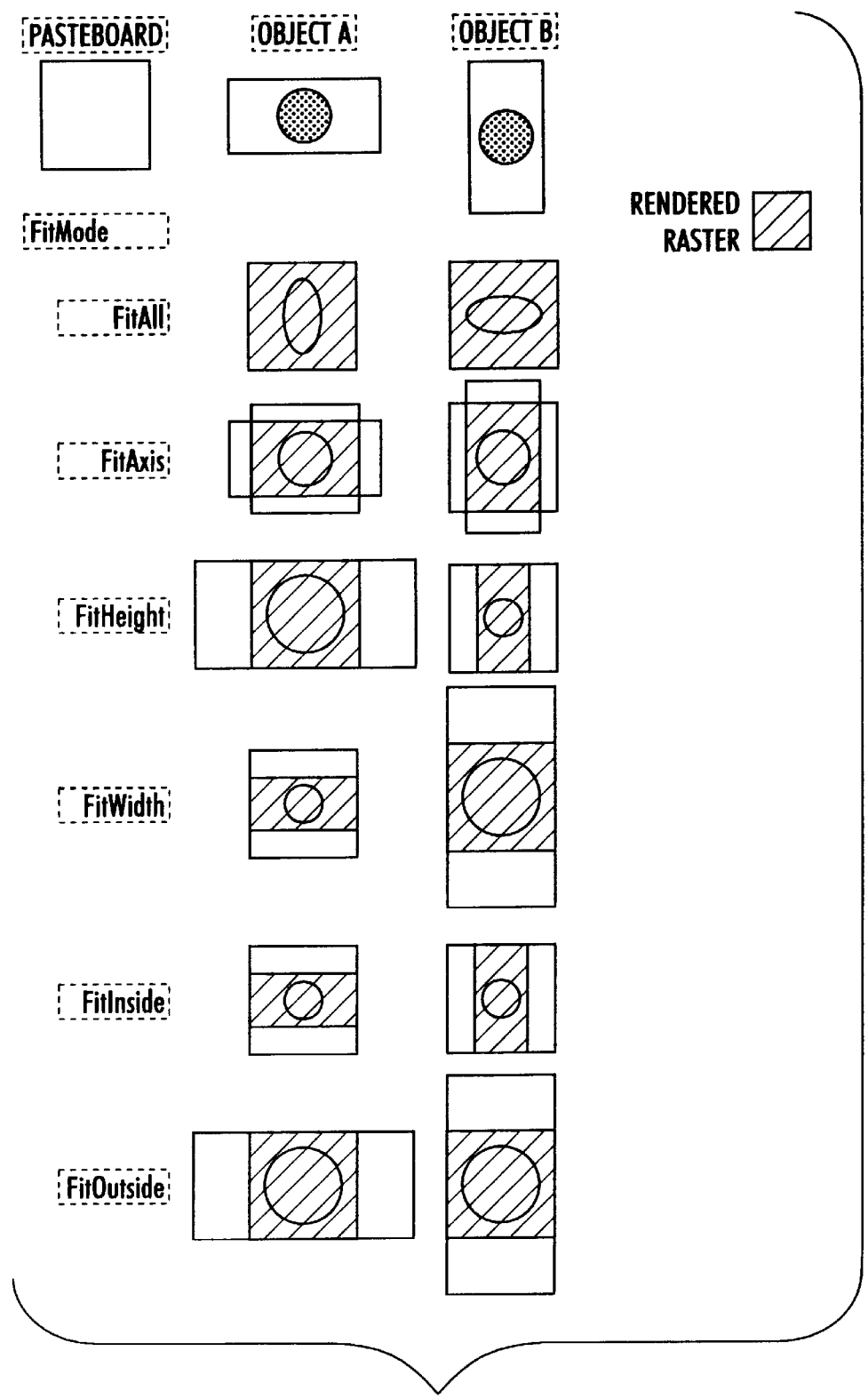
FIG. 5 graphically demonstrates the available FitMode models which define how rasters are rendered in the dimensions defined by the pasteboard in accordance with the invention.

To support this type of rendering, SI defines six FitMode attributes (see FIG. 5) to define how rasters are rendered in the dimensions defined by the pasteboard. These FitModes are defined in FIG. 5. All modes, except FitAll, retain the aspect ratio of the object. However, the raster image actually rendered is always limited by the pasteboard size. Therefore, the actual size of the rendered raster is defined by the intersection of the pasteboard size and the size of the rendered object according to the specified FitMode. In FIG. 5, the rendered object for the FitOutside mode is significantly larger than the pasteboard, but the actual rendered raster is limited by the pasteboard. For the FitInside mode, the object is rendered to fit the pasteboard while maintaining the aspect ratio. Therefore, the actual rendered raster may be smaller than the pasteboard dimensions if the aspect ratio of the object does not match that of the pasteboard. The default FitMode is FitInside.

Figure 6:
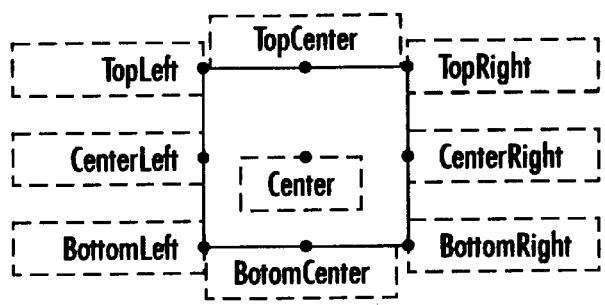
FIGS. 6 and 7 graphically demonstrate the Justification attribute of the invention, with FIG. 6 showing how the Justification attribute is used to specify the rendered raster to be positioned within the pasteboard at one of nine possible locations, and FIG. 7 showing 3 examples of the Justification attribute.
Figure 7:
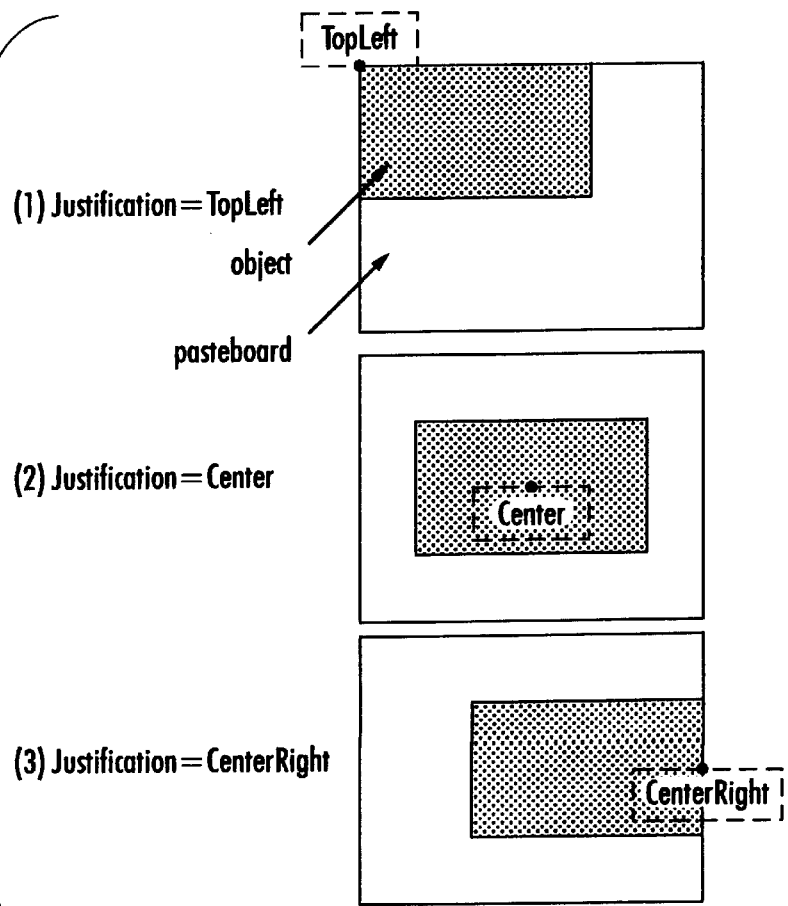

SI objects can be rendered using the FitModes defined above; however, for some applications, it may be desirable to provide control over the location of the rendered raster relative to the size of the pasteboard. The Justification attribute is used to specify where the rendered raster is to be positioned within the pasteboard at one of nine possible locations, as shown in FIG. 6, with examples shown in FIG. 7. The default Justification is Center. The Justification attribute is ignored if the FitMode is FitAll.

Figure 8A:
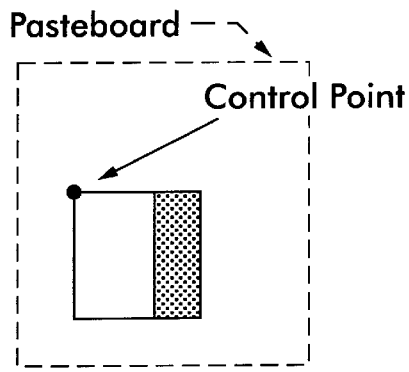
FIGS. 8A and 8B graphically demonstrates the Angle attribute of the invention, where
Figure 8B:
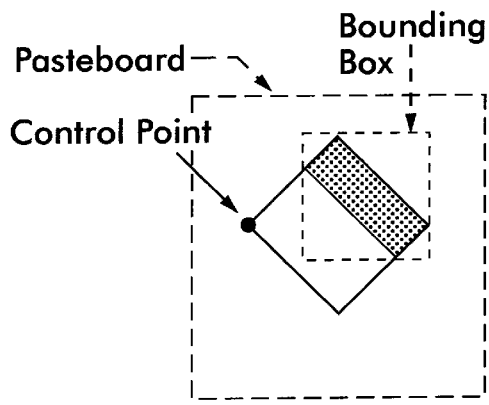

Each object may have an Angle attribute used to rotate the rendered object. The effect will be to render the object into the specified pasteboard, then rotate the pasteboard around the ControlPoint (see below) by the specified Angle in degrees (see FIGS. 8A and 8B). It is the responsibility of the object rendering program being used to properly handle rendering the object at the specified Angle. Some rendering programs may be able to optimally render objects at the appropriate Angle; other renderers may invoke a raster rotation program after initial object rendering. This choice is implementation dependent. The actual size of the rendered raster will be a bounding box of the rotated, rendered object as shown in FIG. 8B. The default rotation angle is 0.0 degrees.

In the case of a parent object composed of a set of child objects, each child is rendered and merged onto the parent's pasteboard at a location known as the MergePoint. The MergePoint is specified relative to the parent object's pasteboard. The ControlPoint is the corresponding point relative to the child's pasteboard. The ControlPoint of the child is to align with the Merge Point of the parent. For example, a ControlPoint of (0.5, 0.5) results in the child being centered on the Merge Point. The default ControlPoint value is (0.5, 0.5).

The ControlPoint (together with the MergePoint) controls where a rendered child object is merged onto a parent object's pasteboard. Within the SID, the ControlPoint is specified and the pasteboard associated with the child object in coordinates relative to the child's pasteboard. However, a rendered child object will not necessarily fill the specified pasteboard depending on the FitMode and the Angle attributes. Thus, the rendering programs for each object must automatically adjust the ControlPoint to maintain the same relative position with respect to the rendered child.

Figure 9:
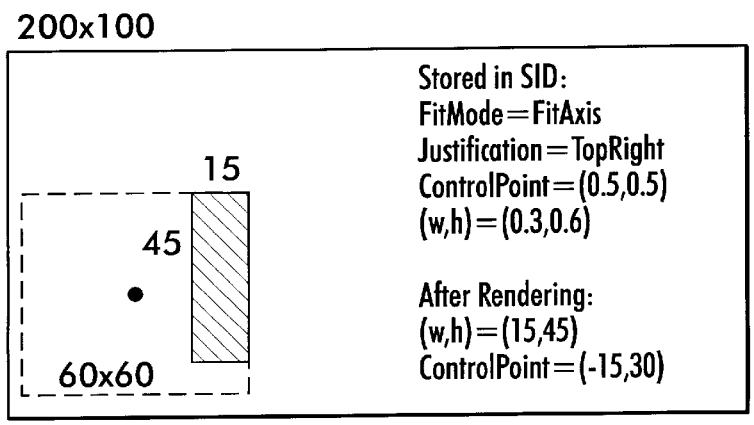
FIG. 9 is a graphic representation showing a rendering adjustment of ControlPoint in accordance with the invention.

Consider the example shown in FIG. 9. The ControlPoint is initially at the center of the child (0.5, 0.5). After rendering with the FitAsIs mode with the child justified to TopRight, then ControlPoint will be automatically adjusted to absolute value (−15,30). This will cause the merge operation to position the rendered raster at the expected position. To understand this example, the child is specified in the SID to have size (0.3,0.6). The rendering indicates the parent is (200×100), thus, the requested child size is 60×60. However, the FitMode indicates FitAsIs. The actual child is stored at 15×45, so the rendered raster will be 15×45. The Justification indicates TopRight, so the 15×45 raster is positioned at the TopRight of the 60×60 requested size, such that the origin of the rendered raster is at (45,0) relative to the requested raster. Since the raster size that flows up the path is the size of the rendered child and not the 60×60 size of the requested child, the ControlPoint must be adjusted to reflect the shift relative to the actual rendered child. The ControlPoint is mapped to (30,30) relative to the requested child size. Since the rendered child's origin is at (45,0) relative to the origin of the requested size, it is easily seen that the ControlPoint is at (30−45, 30−0)=(−15, 30) relative to the rendered child (see FIG. 9).

ControlPoint information is stored into the header of the rendered raster image. In this manner, ControlPoint information is available to any IPOs that require knowledge of it. In particular, the SpatialTransform IPO must properly adjust the ControlPoint according to the specified transformation, as will be shown in the examples below.

A4. ReadObject

ReadObject represents a procedure that converts an SI object into a raster image suitable for further processing. ReadObject takes a pasteboard, an SI object (whether created or scanned in), and the absolute size of the parent object as parameters. In the case of the RootObject, the specified size is the desired output image dimensions and the relative size field of the pasteboard will typically be empty, implying the default value of (1.0, 1.0). Other information may be passed to ReadObject() if such information can be used to improve the quality of the object rendering.

ReadObject performs several operations in order to render the appropriate raster image: 1) determines absolute pasteboard size; 2) determines all representations referenced by the object; 3) based on available information, chooses an appropriate representation for rendering; 4) renders data into raster according to FitMode, Justification and (possibly) Angle by invoking an appropriate rendering procedure; 5) rotates rendered raster to the angle specified by Angle attribute (if not performed in step 4); and 6) adjusts ControlPoint position. The output of the ReadObject procedure is a raster image of the rendered object. The ControlPoint will be specified in the header of the raster image in the coordinate system of the raster image.

ReadObject determines the absolute pasteboard size by multiplying the parent dimensions by the relative size specified in the pasteboard. If no pasteboard is specified, then a relative size of (1,1) is assumed. For example, if the specified size was (1000×2000) and the relative size (1.0,0.5), then the absolute size of the pasteboard will be (1000×1000). The actual rendered object may not be this size depending on the FitMode and Angle attributes, as discussed above.

An SI object acts as a reference to a data file, or representation, that can be rendered into a raster image. The representation may be one of several types, such as, raster, text and/or vector graphics. Also, one object may reference several representations, each of which represents the same image but may differ in the storage format, size and/or resolution. When ReadObject is invoked, it must determine which representation is the "best" representation to render by invoking the Finder procedure. Finder will locate all representations referenced by the object and will choose which representation is most appropriate for rendering.

Once a representation has been selected, it must be rendered into a raster image. Each supported data type must have a render procedure associated with it to convert the representation into a raster image. These render procedures must support the FitMode and Angle attributes. Preferably, the following data types are supported:

| Date Type | Renderer | Example |
| --- | --- | --- |
| raster | render_raster | TIFF, RES, PCX |
| simple text | render_text | one line of text, one font |
| simple graphics | render_graphics | CGM |
| pattern | render_pattern | constant color |
| IPD | render_ipd | |

The Render procedure may incorporate the rotation angle directly into the object rendering, or it may apply a raster rotation operation to the rasterized object. For example, available text rendering programs have the ability to directly render text at a specified angle, resulting in better quality than a horizontal render followed by a raster rotation.

As previously discussed, the ControlPoint must be adjusted to keep the same relative position of the rendered object and the MergePoint depending on the Fit Mode, Justification, and Angle. It is the responsibility of ReadObject to make this adjustment, and to insert the adjusted ControlPoint into the raster image header to make it available to any IPOs that may also adjust it (such as SpatialTransform).

A5. Finder

The ReadObject procedure invokes the Finder function to locate and return object data for rendering into an output raster image. The Finder procedure performs six actions pursuant to the rendering of an SI: 1) locates all representations of the object; 2) identifies the type of each representation (TIFF, text, graphics); 3) determines attributes of each representation that are necessary for choosing the best representation; 4) applies a merit function to each available representation and selects the representation with the highest merit value; 5) returns a pointer to the representation data; and 6) returns the representation data type. The Finder mechanism is necessarily dependent on the particular implementation. However, some statements as to functionality can be made.

In the current syntax of the Structured Image Definition Language (SIDL), an SI object can be described in one of three ways (the following source code is subject to copyright protection, as discussed above, and can be executed on the hardware system previously described):

```
(1)  Object = {
         External = {
             System = "UNIX ® "
             Name = "bird.TiF";
         };
     };
(2)  Object = {
         Internal = {
             Bytecount = 1024;
             Data = {
                 . . .
             };
         };
     };
(3)  Ojbect = {
         IPD = {
```

-continued

```
AspectRatio = 1.5;
DefaultWidth = 4 in;
...
};
};
```

An object defined as External is such that data referenced by the object is not stored within the current SID. Typically, the actual data is stored in a separate file. The System field is a description that the Finder uses to understand how to locate the data. The Name entry is a set of key words that Finder will use to actually locate the desired data. In the example above, Finder is implemented to understand that a system entry of "UNIXs®" indicates that the actual data will be found by searching an appropriate UNIX® file system path for a file with the name entry of "bird.TiF". If the System entry had been "SYBASE®", then Finder would treat the key words in the Name field as key words to search a SYBASE® database for the data.

An object defined as Internal contains the data stored directly within the SID. This is useful for storing small objects such as raster icons or simple text files directly within the SID, thus not requiring external storage.

IPD is an SI object data type that enables a structured image to be composed of other SI objects and IPOs. Based on the information stored within the SI object, Finder must locate all available representations and determine the data type and any attributes required for choosing the "best" representation for rendering. The mechanisms/protocols used to implement these functions are not defined in SI, but it is understood that such mechanisms exist and are available for use herein.

Once all representations are determined, Finder must choose the most appropriate representation to render into the output raster image. The mechanism is implemented by applying a merit function calculation to each representation. The exact merit function is implementation dependent and is not defined in the SI; however, it should be based on attributes of the representations, desired output image attributes, target output device (e.g., black and white printer, color display) and complexity of processing. Once a representation has been chosen, Finder returns a pointer to the actual data and the data type to ReadObject for processing to begin.

A6. Image Processing Definition (IPD)

Figure 10:
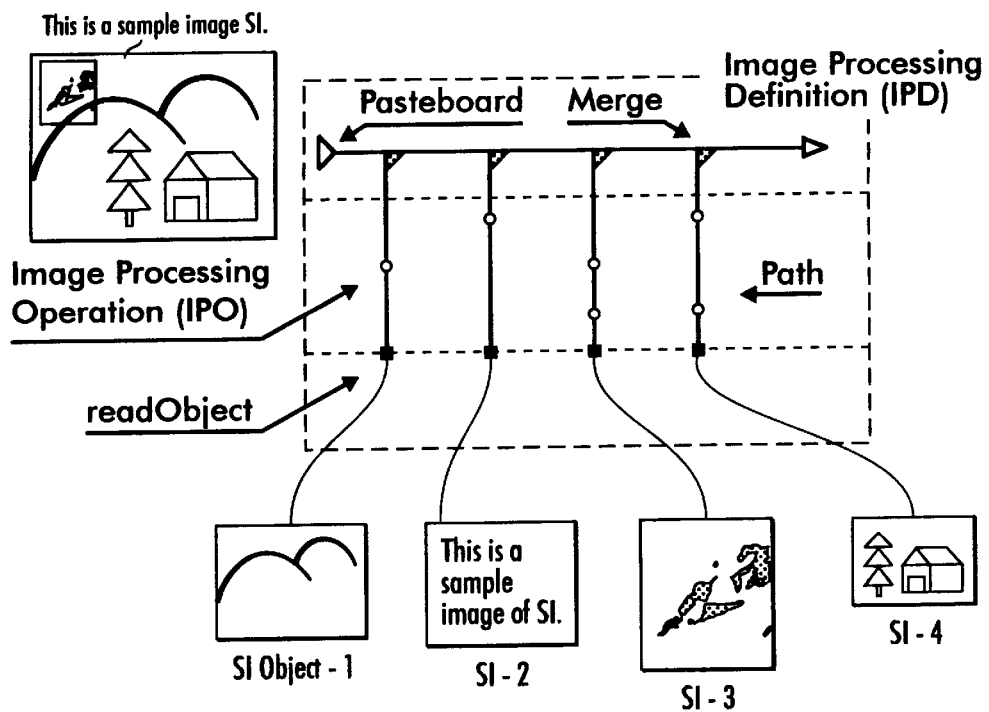
FIG. 10 is a graphic representation of an Image Processing Definition (IPD) as it relates to the output SI, which represents a structured description of references to component objects and Image Processing Operations (IPOs) applied to those component objects.

As discussed above, IPD is an SI object type that enables an SI to be composed of other SI objects and IPOs. IPD represents a structured description of references to component objects and IPOs applied to those component objects. FIG. 10 is a graphical representation of an IPD.

Figure 11:
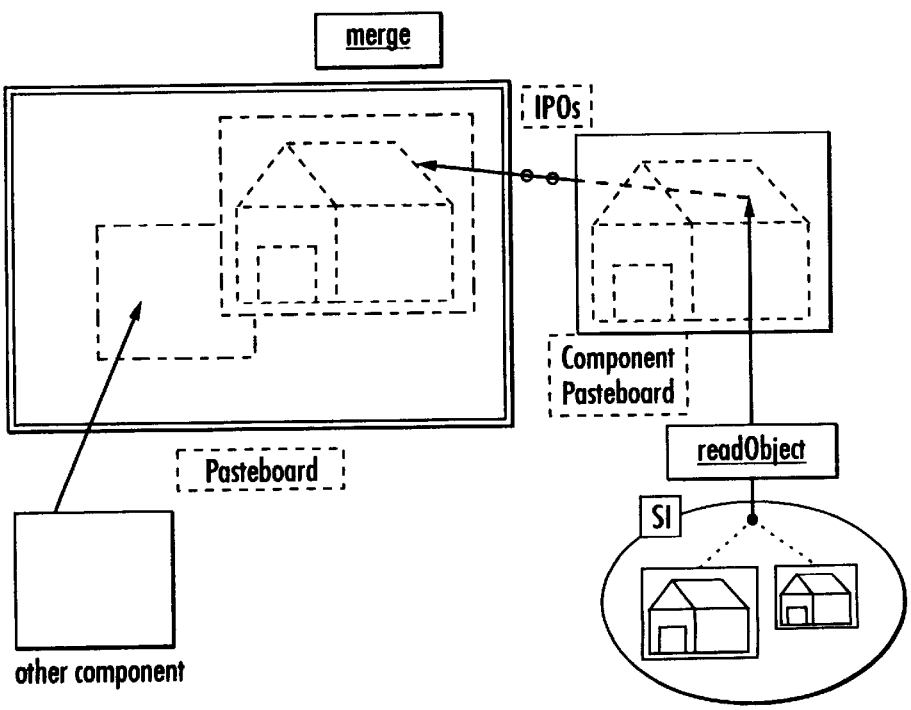
FIG. 11 depicts the flow of raster data during the rendering of an SI.

An IPD consists of references to the following descriptors: 1) default size; 2) ReadObject; 3) path; 4) IPO; 5) merge; 6) pasteboard; 7) initializer; and 8) component pasteboard. In FIG. 10, each vertical line, called a path, is a collection of IPOs. ReadObject represents a procedure that converts an SI object into a raster image suitable for processing by the IPO in the path. The rendered object flows through the path and is processed by each IPO sequentially. Each path has stored within it a pasteboard used by ReadObject to define a "frame" into which the SI object is rendered. This pasteboard is referred to as the component pasteboard. The horizontal line is the IPD object's pasteboard and represents a "blank" raster image onto which component pasteboards will be merged. The black triangles represent Merge operations where component pasteboards are combined onto the object's pasteboard. The merge order of component pasteboards is explicit, thus a sense of "top" and "bottom" images is supported. FIG. 11 depicts the flow of raster data during the rendering of an SI (i.e., the control flow from ReadObject to Merge).

Each IPD must include information which specifies a default size for the IPD. This information is used as a hint for the rendering programs as to the size the image was intended to be rendered to. In the current SIDL syntax, this information is preferably stored as an aspect ratio and a default width string. For instance,

```
IPD = {
    AspectRatio = 1.5;
    DefaultWidth = 4 in;
    ...
};
```

The AspectRatio field is defined by the ratio of height over width. The DefaultWidth field is a string defining a width and a unit. Possible units are: in, cm, mm, m, pt, and pix.

IPOs are device independent descriptions of image processing commands. Only one IPO is currently specified in SI: the SpatialTransform IPO, which will be discussed in greater detail in the examples that follow. It is understood, however, that additional IPOs will be implementation dependent. Among these, certain fundamental functions are considered essential and are preferred IPOs as follows:

| | |
|---|---|
| 1) Transformer: | spatially transforms the size or shape of an image (e.g., affine, warp); |
| 2) Formatter: | converts pixels from one format to another (e.g., convert, interleave, cspace); |
| 3) Filter: | applies various filtering operations (e.g., convolve, median, morphological); |
| 4) Colorizer: | adjusts color value of images (e.g., relative, absolute, contrast, white-point); |
| 5) Mask: | apply mask operations (e.g., add, extract, convert, apply); and |
| 6) Misc.: | apply other miscellaneous operations. |

An IPO can specify the selection region of its operation. A selection is a description of which pixels in an image are to be processed in a specific operation. For example, a selection may include bitmaps or mathematical descriptions of regions. Normally, selections are binary in nature, i.e., a pixel is either processed or not processed. However, a "gray" selection value will cause the output pixel value to be scaled between the original pixel value and the processed pixel value.

Figure 12:
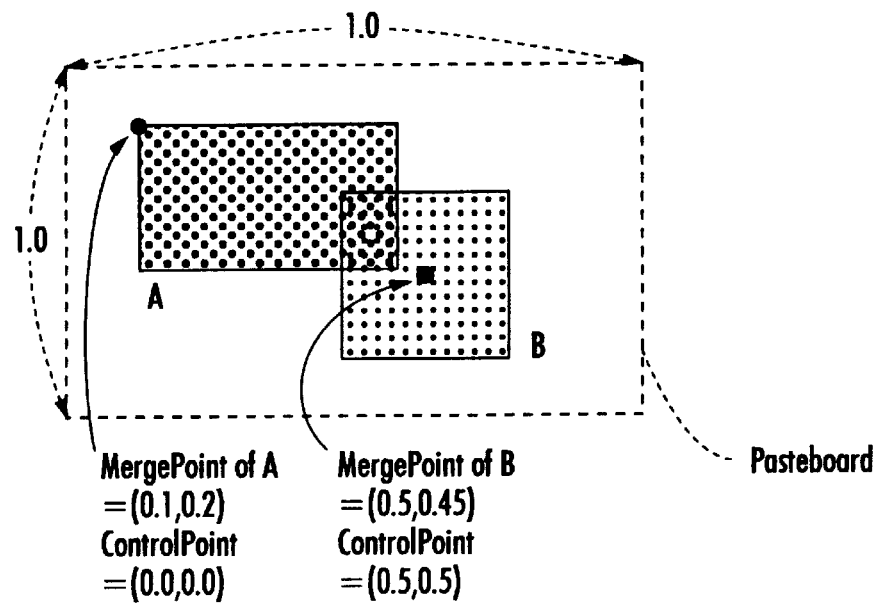
FIG. 12 is a graphic representation showing all child objects are merged into the parent pasteboard at the location specified by the MergePoint (relative to the object pasteboard) and the ControlPoint (relative to the child pasteboard)

As shown in FIG. 12, all child objects in an IPD are merged into the parent pasteboard at the location specified by the MergePoint (relative to the object pasteboard) and the ControlPoint (relative to the child pasteboard). Merge order is explicit in the IPD.

Figure 13:
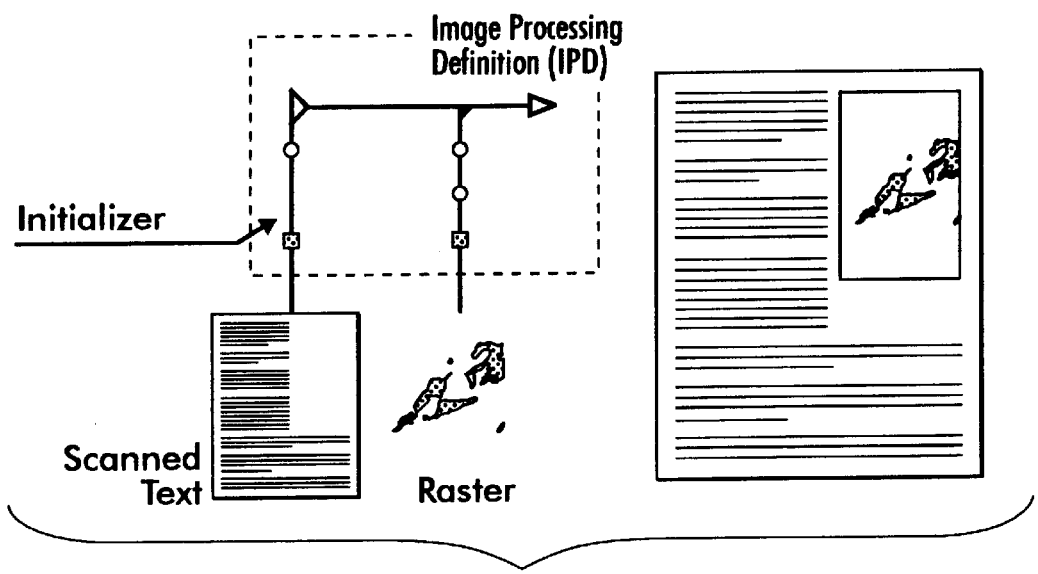
FIG. 13 is a graphic representation showing the pasteboard initializer function, in this case, initializing a pasteboard with a scanned text image.

Normally, the pasteboard of an IPD object represents a "blank" raster onto which component pasteboards are merged. It is possible to initialize a pasteboard with a color, pattern, or even a raster image using the Initializer (see FIG. 13). An Initializer is actually a Path that contains a ReadObject and IPOs. The restriction is that the relative size be (1.0, 1.0) and that no spatial transformation IPOs exist in the Path. The pasteboard will be the size of the rendered Initializer. Typically the Initializer is used to colorize the pasteboard or to initialize the pasteboard with a background raster image.

B. UNBOUND/INCOMPLETE STRUCTURED IMAGES

The invention further allows for structured images to be defined that have fields within the SID identified as undefined. Such fields are place holders for data that will be dynamically bound to the SI and are run-time (render time) specific. There are two classifications for undefined fields: 1) Unbound SI; and 2) Incomplete SI.

B 1. Unbound Structured Image

In general, component objects of an SI are not contained within the SID itself but are referenced by the fields of SI objects (such as the System and Name fields of an External object). In the current SIDL syntax, these fields can be labeled as undefined. This allows for the dynamic binding of data to the structured image.

Consider, for example, an interactive editing session where a user is creating an SI for printing. The SI is to be used only once, then discarded. The user creates the SI using an interactive SI editor (again, this is merely an exemplary way of creating the SI and is not necessarily any more preferred than creation by template or automatic creation using appropriate scanning software). All components of the SI are known and defined. Once completed, the user prints the SI and the job is complete. The SID generated to describe this SI is known as fully bound, meaning that all components were defined prior to rendering. That is, fully bound means that all objects in the IPD point to defined entities prior to the rendering of the output SI raster.

In many applications, however, fully bound images are not adequate for the job. Consider, for example, an advertiser generating a brochure in which one component of the image is to vary with geographic sales location. All possible images of this component are stored in a database. The advertiser can define the System entry of an External object to identify the database System, e.g., SYBASE®, but the Name field will be marked as undefined. At run-time, the correct key word can be dynamically bound to the object for generation of each requested output image. Using this method, a single SI can be used to generate many different output images. Unbound images are valid SIs, but they require additional information at runtime to be rendered.

Figure 14:
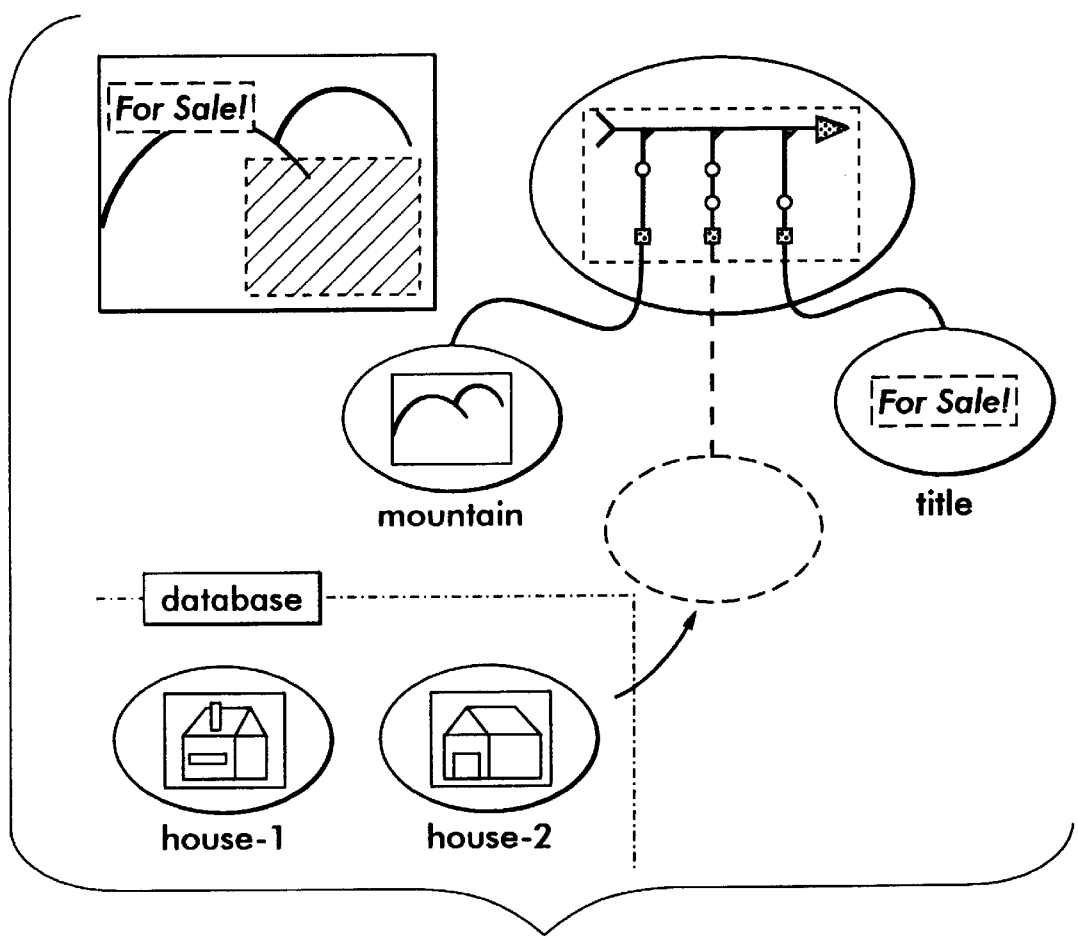
FIG. 14 is a graphic representation showing an Unbound SI (with respect to input objects) in accordance with the invention.

Notably, SI has no preference toward Bound or Unbound images, the choice is application dependent (see FIG. 14 for a representative user display using Unbound structured imaging).

B2. The Incomplete Structured Image

Figure 15:
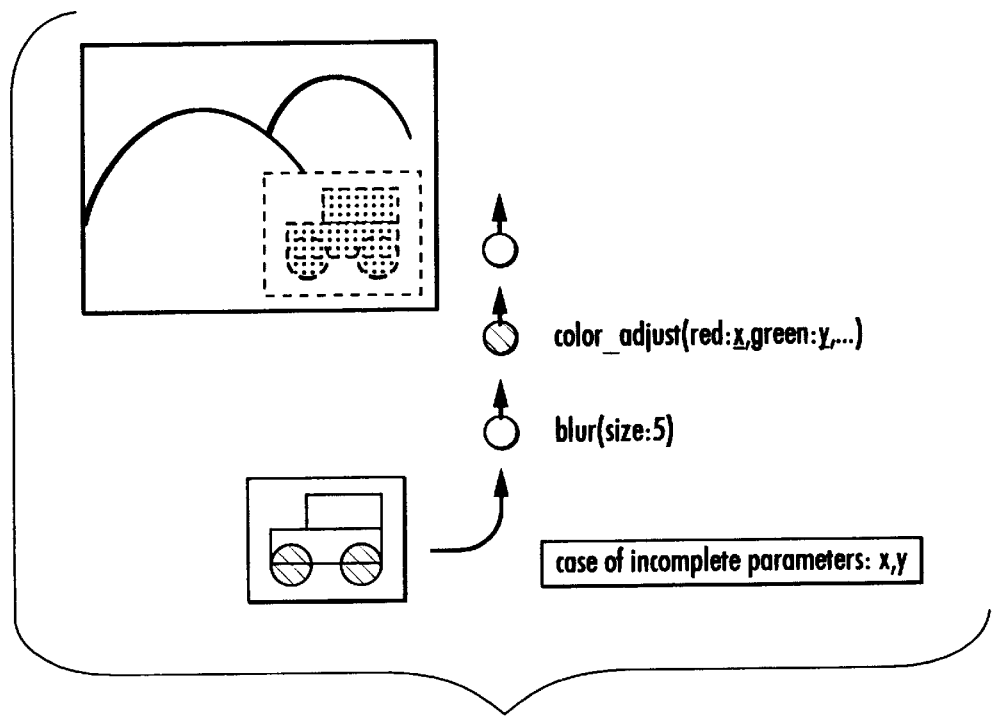
FIG. 15 is a graphic representation showing an Incomplete SI (with respect to image processing operations and/or attributes) in accordance with the invention.

Similar to the concept of Unbound images, the invention allows parameters of IPOs to be undefined. Also, an IPO itself may be undefined. For example, consider an advertiser creating a brochure containing automobile images in which the color of a car is to change between prints. The advertiser can have separate images of the car with all possible colors and use dynamic binding of the SID. The advertiser may also choose to use a single car image and pass the desired color as an argument to the render procedures to be dynamically bound to the IPO. Without the color value being provided at run-time, the rendering of the output raster could not be performed. This is known as an "incomplete" SI (see FIG. 15). An incomplete SI is one in which some part of the SID is not defined and must be bound at run-time. Incomplete SIs are valid SIs, but they cannot be rendered without additional information.

B3. Rendering Unbound/Incomplete Structured Images

There are two important considerations evident when rendering an unbound SI: 1) binding mechanism; and 2) rendering model.

The mechanism by which Unbound SIs are dynamically bound is implementation dependent. Four possible mechanisms are identified herein, however, others may be possible:

1) Require that SI always represents a "complete image"; if SI is unbound/incomplete, perform a prefiltering operation to modify SID.
2) Using current reference binding mechanism. The SID file can include undefined references and binding information as described in another file as "tag" definitions corresponding to undefined references in SIDL. Binding is realized, for example, by concatenating the SID file and the bind information to create a complete SID.
3) Specify the binding information as parameters to the SI renderer. Or
4) Include a Dynamic Binding Method to the Finder procedure that is invoked automatically to satisfy any unbound/incomplete field in the SID.

For purposes of the invention, all of the above described binding mechanisms are preferred; however, it is understood that the choice between the various mechanisms will be implementation dependent.

For certain applications, an SI may have fields that cannot be fully bound at render-time. For example, consider a document where each page is an SI containing six identical child objects that are to be bound at render-time (e.g., a real estate listing where each child object corresponds to a house for sale). Consider that the document is to display a total of nine houses. This would require two document pages, but only three of the child objects will be required on the second page. The SI renderer can operate in three models, although others may be possible: 1) fail with an unbound error; 2) ignore unbound objects, treat incomplete IPOs as non-operations; and 3) render only the pasteboard of unbound objects, treat incomplete IPOs as non-operations.

All three models are preferred for use with the invention, however, it is appreciated that the choice is application dependent.

C. RENDERING

Although rendering is not specifically defined in the SIDL, a brief explanation is provided herein for clarity. In real rendering processes, some rendering methods can be selected according to conditions such as purpose, priority, resources and so on. Rendering is an implementation specific concern, however, it is understood that all implementations of SI rendering programs must produce equivalent output for a given SI and output device. It is not expected that results be exactly identical because slight differences in image processing programs will produce different results; however, the outputs must be reasonable. This statement is much like saying different C compilers do not have to generate identical machine code, but all compilers must generate working machine code.

Two approaches have been examined for rendering of SIs: 1) Object-oriented rendering; and 2) Processing-tree rendering.

C 1. Object-Oriented Rendering

Figure 16:
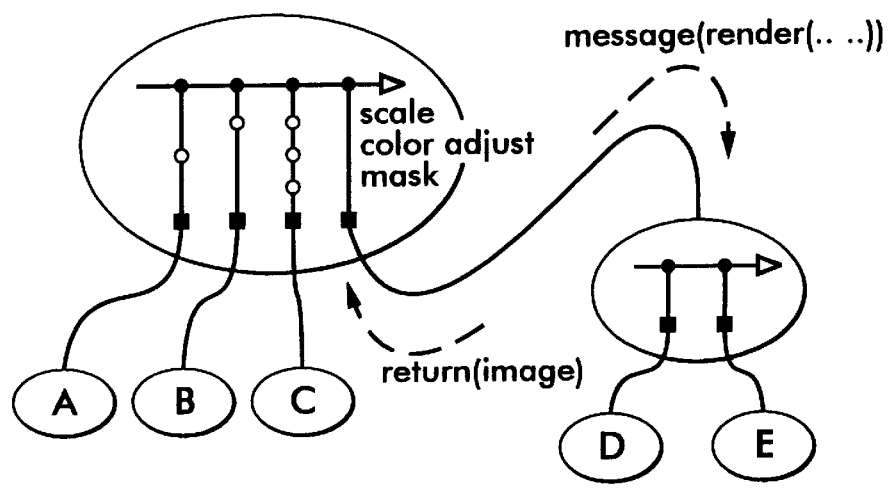
FIG. 16 is a graphic representation showing Object-oriented rendering in accordance with the invention.

Object-oriented rendering (see FIG. 16) is a method of top-down parsing of an object tree directly and rendering each object (SI) as you go. When an SI receives a message "render", it is rendered by given size and resolution attributes or dimension attributes. If other components are needed for construction of the SI, the object sends the "render" message to t i e component objects and gets th e output images. Object-oriented rendering is direct execution of an object tree, which can best be thought of as "interpretation" of an object tree. Object-oriented rendering is especially suited for rendering in interactive editing situations.

C2. Processing-Tree Rendering

Figure 17:
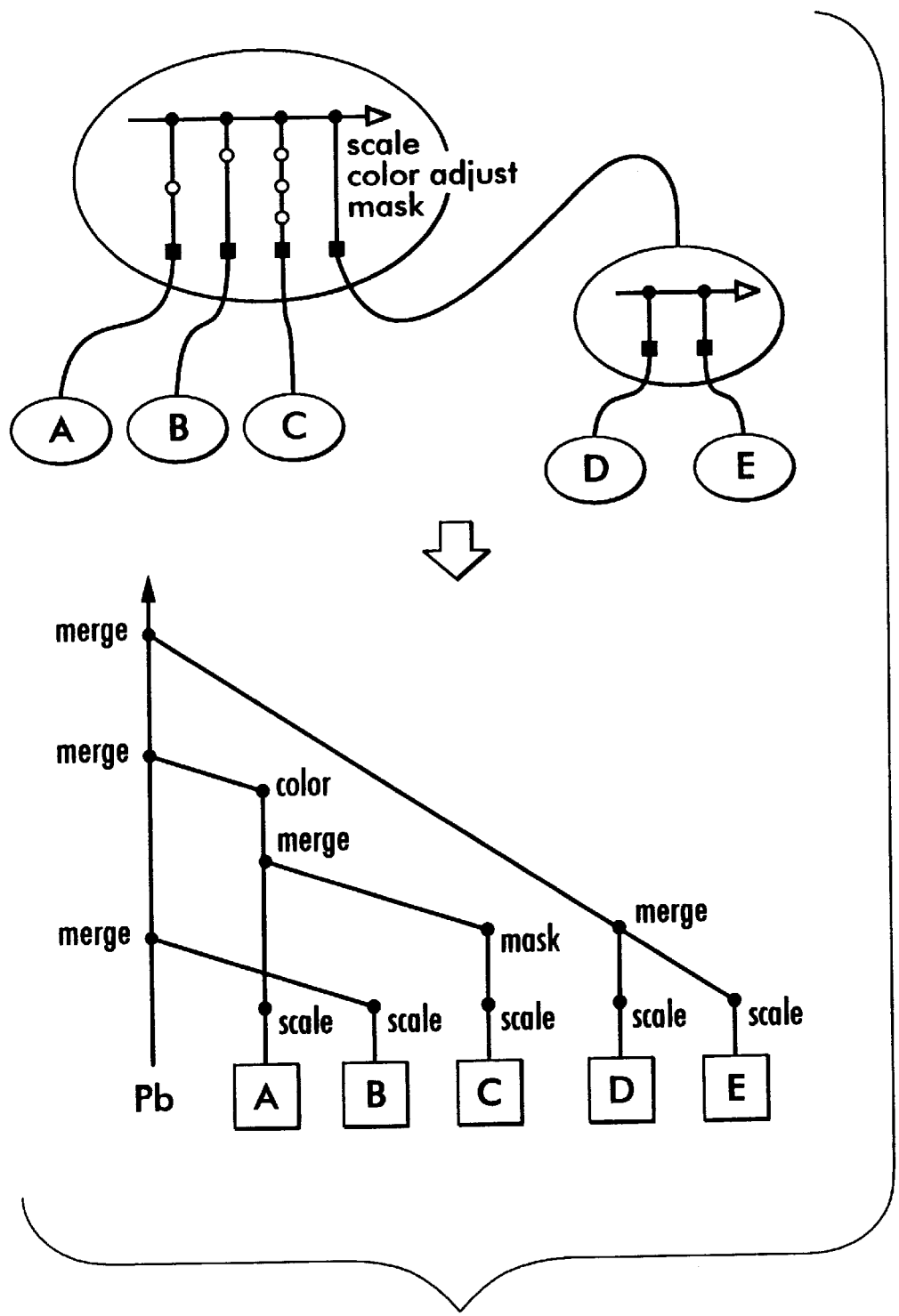
FIG. 17 is a graphic representation showing Processing-tree rendering in accordance with the invention.

A Processing-tree is a directed acyclic graph of image processing commands that is device dependent and resolution dependent (see FIG. 17). A Processing-tree is generating by expanding the SID associated with all nested SIs into a single SI, the n applying device dependent information to convert all coordinates and dimensions into absolute, device dependent values. Data contents pointed to by representation entries are rendered into rasters. Since the Processing-tree is device dependent and resolution dependent, the IPOs can be optimized for processing speed by a variety of optimizing techniques that are understood by those skilled in the art. For example, the user may combine two scale and one rotate operation into one affine operation, thereby combining conforming cascaded operations into affine. In essence, why perform three separate operations when they may be combined into one to improve processing speed.

The output image is then rendered by a simple traversal of the resulting Processing-tree. This can be thought of as a "compilation" of an object tree. Processing-tree rendering is especially suited for rendering of very large output images that are typical in document printing. The image processing optimization can decrease the time required for rendering significantly.

D. EXAMPLE OF STRUCTURED IMAGING

Figure 18:
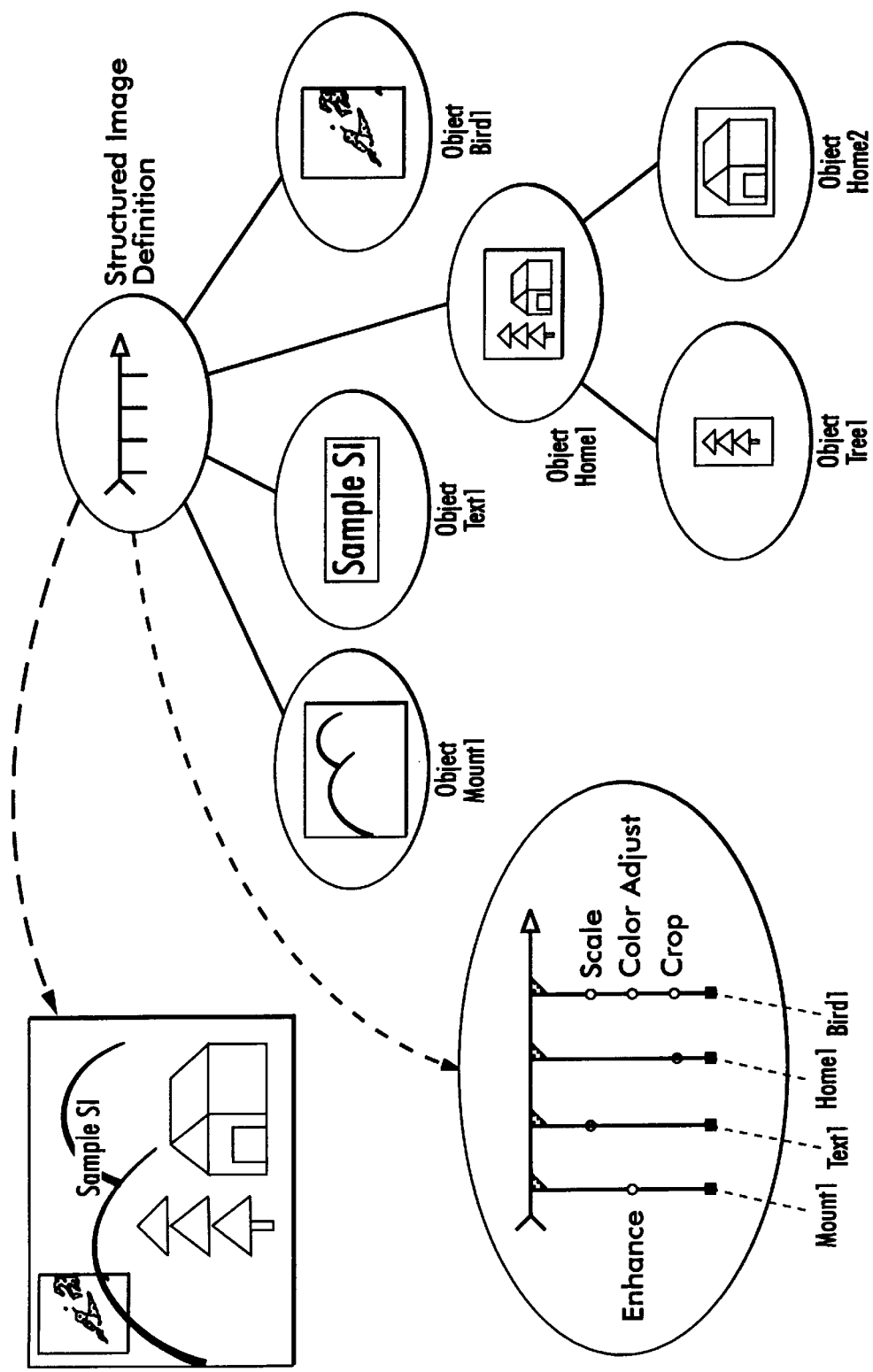
FIG. 18 provides a sample SI with associated SID file graphically displayed in accordance with the invention.

The SI shown in FIG. 18, is briefly described below. This descriptive example is written using the SIDL as described above.

The top level SI in this composite comprises four components:
1) mountain image—raster image object (Mount1);
2) "Sample . . . "—text object (Text1);
3) tree and house—IPD (Home1); and
4) bird image—bitmap raster object (Bird1).

The second level SI comprises two components:
1) tree graphics—graphics object (Tree2); and
2) house image—raster object (Home2).

The SID file associated with the top level SI is depicted in FIGS. 19 through 22. SIs are described (again, the following source code is subject to copyright protection and can be executed on the hardware system previously described) as a set of "tags" in SIDL, which are specified by the name of tag type and tag body enclosed by "{" and "}". Tags may be named using the ":name" syntax. The tag name can be used as reference to other tags by prefixing "$". The Object tag is the top level tag of the SI. In this example, the Object tag represents an IPD object and its description is in the referenced tag "ipd1". The IPD tag "ipd1" defines the AspectRatio and DefaultWidth tags, the pasteboard attributes FitMode, Justification and Angle, and four Merge tags whose sequence specifies the merging order of "merge1" through "merge4". Each Merge tag specifies a merging point relative to the pasteboard with the MergePoint tag, and an image processing sequence with a Path tag. The Path tag denotes the child object with another Object tag, the relative size with a Size tag, the position of the ControlPoint (relative to the child) with the ControlPoint tag, and the image processing operations with a list of IPO tags. Notice that path1, path2 and path4 all refer to raster, text or graphic files. Path3 refers to another SID file that creates a raster image from combining a graphical tree with a raster image of a house.

D 1. Multiple Representations (MR) File Format

Figure 23:
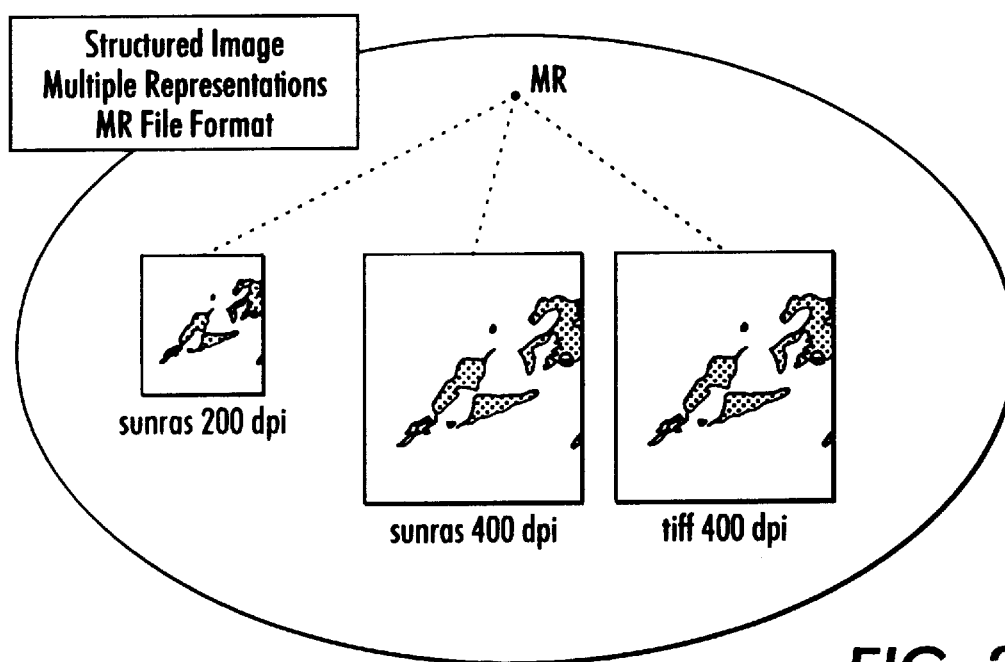
FIGS. 23 depicts an exemplary Multiple Representation (MR) file and a graphic demonstration thereof.

For some applications, explicit descriptions of available representations are preferred. For this reason, the MR file format is defined. This file format currently uses syntax similar to the SIDL,. FIG. 23 is an examples of the MR file format. Each representation is listed with a Format field that identifies the file type, and a Data field to explicitly define the data. For filebased data such as a TIFF file, the Data field contains a UNIX® path to the file. For simple text, the Data field contains the text string. The MR format allows each representation to have explicitly defined a set of attributes that describe the data. For raster data, attributes may include dimension, photometry, or other attributes. For text objects, the attributes may include the font, style, etc. Use of the MR file format, however, is not preferred with this invention.

D2. SpatialTransform Image Processing Operation (IPO)

The only IPO specified within the SI format is the SpatialTransform IPO, which serves to perform linear spatial transformation on raster image contents. Examples include, rotation, scaling, and shearing. In general, the SpatialTransform IPO performs all affine transformations except translation (which is controlled through the MergePoint and the ControlPoint attributes).

The parameters of SpatialTransform are as follows:

| Parameter | Value |
| --- | --- |
| Scale | 1 value for XY-scale (preserve a.r.) or 2 values for arbitrary scale (interpolation is application dependent-note: probably should be an argument) |
| Rotate | Angle (in degrees) |
| Shear | Shear Angle (in degrees) |
| Mirror | "X" or "Y" |
| TransformPoints | 3 pairs of corner points |
| Affine | Affine coefficients |
| FixedPoint | (x,y) relative to child being transformed - default value is the ControlPoint location |

The FixedPoint parameter allows the application of spatial transformations around a point of reference. For example, specifying a FixedPoint allows the user to rotate the object around the FixedPoint instead of rotating around the center of the object. In general, any supported spatial transformation can be defined to operate around FixedPoint. Since the lixedPoint is a parameter to SpatialTransform and is not part of the pasteboard, the IPO adjusts the ControlPoint automatically to ensure that the child object is merged into the parent pasteboard at the correct position. An example of how the ControlPoint is adjusted is described below.

Figure 24:
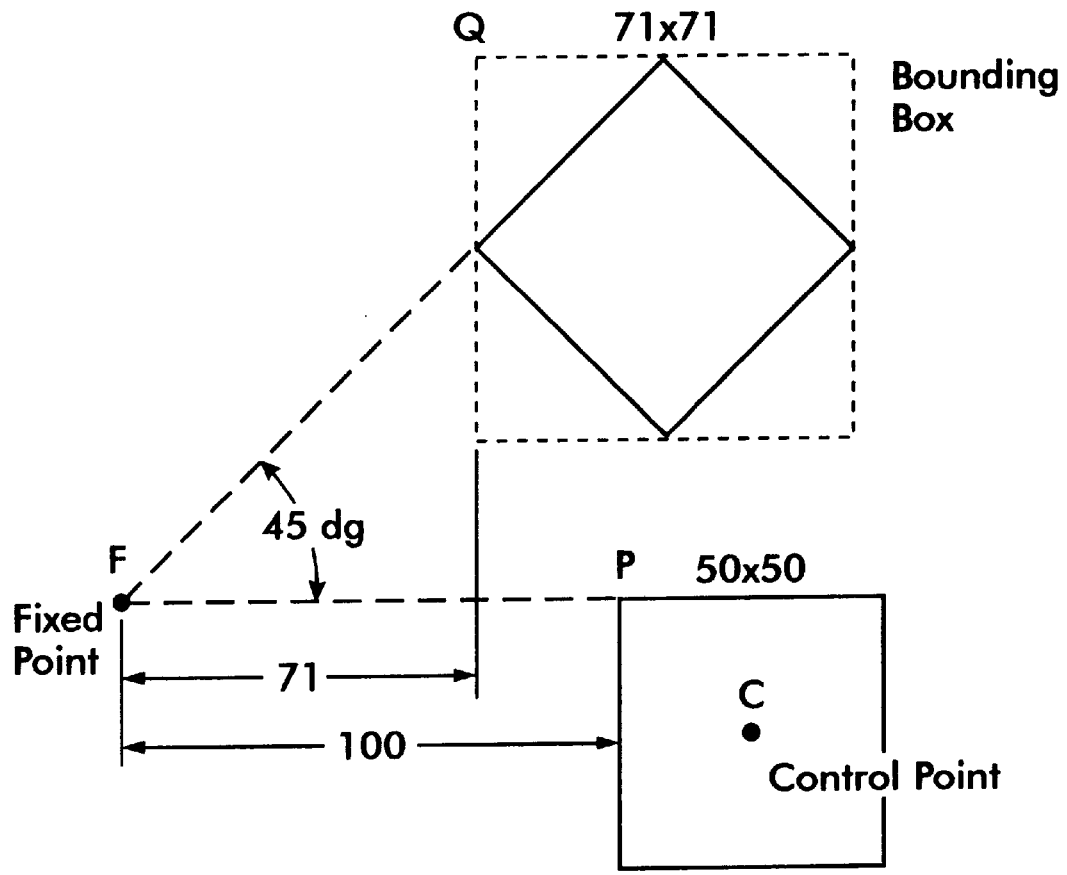
FIG. 24 depicts the SpatialTransform IPO for a SI.

For example, referring to FIG. 24, assume an object has a ControlPoint C of 0.5,0.5) and a fixed point of (2.0,0.0) relative to upper left corner P of the child. Suppose the rendering indicates the child is of size 50×50. The FixedPoint F is (−100,0) relative to the child. The ControlPoint is initially (25,25) relative to P, and (125,25) relative to the FixedPoint. Rotating the child 45° about the FixedPoint will generate a child with a new size of 71×71 (bounding box) with an origin at (71,107) relative to the FixedPoint. Recall that the original control point was (125,25) relative to the FixedPoint. Therefore, the ControlPoint will be adjusted to be (125,25)−(71,−107)=(54, 132) in pixel size, i.e., (0.76, 1.86) relative to the origin Q of the rotated child. Thus, the ControlPoint will be adjusted to ensure that rotation about a FixedPoint will result in the child being merged into the pasteboard at the proper position.

Alternatively, an interactive editor can handle center of rotation, etc., during creation of the SI and simply adjust the MergePoint properly when writing the SID. That is, the user can set the center of rotation, for example, at a desired location and the SID is no longer concerned with it.

E. A SECOND EXAMPLE OF STRUCTURED IMAGE GENERATION

Importantly, SI is much more than a mere interactive editor. For instance, a high school yearbook printer has many individual pictures to prepare electronically for printing as a finished yearbook. In particular, photos must be scanned into the database, either individually (which is extremely time consuming) or technology exists where up to twelve photos may be scanned in at a time. Unfortunately, however, no matter how hard the user attempts to properly line up the individual pictures for scanning, there will always be slight deviations as a result of scanning. Usually each picture has a bar code or some other identifying feature to tie the picture to the name which will be printed under it.

Software exists that is capable of generating an SI automatically in the scanning situation described above. That is, an SI is created that identifies each individual child object (i.e., the individual pictures) and includes image processing operations to correct any misalignment, and properly configure each picture on the page with the appropriate text underneath (bar code reference). Such software is capable of scanning many objects at a time and each child object will be derotated/rotated for proper rendering at printing. Therefore, the yearbook printer can, at his option, pick only the child objects desired for placement on that particular page, line them up as desired, add appropriate text, and print. As discussed above, the child objects are referenced by bar code for call up.

Additionally, the yearbook printer may wish to create another SI by creating a template with "unbound" holes for the pictures and text as desired. The yearbook printer then binds the appropriate number of child objects to that template for printing. Importantly, however, the template can also have intelligent processing built in (i.e., background, etc.) that will automatically change color, cropping, special effects, and so forth.

F. CODE GENERATION

An SI includes not only the source data, but also the image processing operations required for rendering them. SI technology supports re-editability, customization and enhancement, automatic image assembly, and high performance imaging (i.e., parallel, distributed, caching, etc). This provides a very powerful framework for describing images for later editing and re-editing. SI, then, is a base technology capable of addressing the entire gamut of acquisition of objects, storage, edit/preparation and delivery/transmit to output rendering. The present invention is directed to automatic code generation based on SI technology. Unbound or incomplete SIs were envisioned to enable the creation of templates for automatic image assembly. As described in detail above, unbound and incomplete images are valid Sis which require additional information for proper rendering. Once the additional information is provided, the SI is process into a final raster and then rendered. By using the Structured Images technology in a way that takes advantage of the unbound and incomplete features of SI, a system can be constructed that generates image processing code for custom applications automatically and which will provide for ease of editability of the SI by end users.

Custom applications are defined and converted to running code in minutes, or may be shipped to a co-user of the system in a compact portable form for remote code generation. Structured Image technology supports the concept of a raster image that is not completely defined. It is permissible to create a structured image that refers to a undefined component object. At render-time, the undefined component object must be resolved for a raster image to be generated. A Structured Image containing a reference to an undefined component object is known as "unbound." Similarly, a structured image may reference an image processing operation or parameter not explicitly defined with in the structured image. Again, this reference must be resolved at render-time. Such a Structured Image is called "incomplete." Unbound and incomplete structured images were envisioned to enable the creation of templates for automatic image assembly. Unbound and incomplete images are valid structured images which require additional information for proper rendering. Rather than typical rendering protocols that result in a typical image raster, the invention carries out partial execution of the SI and generates code based on the unbound and incomplete SI characteristics. Software code is developed after compilation within minutes versus many man days of programming that would be required on custom program.

As discussed above, SI files are written out in SIDL (Structured Image Definition Language) that has been specifically designed for SI. This language exhibits characteristics useful for SI processing. For example, the structure evident within an SI is maintained. The well defined organization of image processing operations and render procedures are part of the language and may be useful in optimizing the processing operations. An SI render program analyzes the SIDL and generates the appropriate image processing calls necessary to render the output raster. Taking advantage of the unbound and incomplete aspects of the SI technology gives rise to an extension to the original intent. The invention provides a code generating solution based on SI where the Structured Image Definition (SID) does not have to describe an output image raster. If all input images are undefined (unbound) and a subset of the image processing variables are not defined (incomplete), the SID could be thought of as a description of an image processing task rather than an output raster. A program could be written that assembles a combination of boiler plate code with custom argument parsing and image path coding to generate source code describing the image processing operations in the unbound incomplete SID. With extensions of the SID the user of this code generator could be prompted to supply operational documentation where at creation time the operating instructions would be combined with the already available low level reference for the calls it assembled to automatically generate documentation.

Nested sub-component references and associated image processing operations necessary to generate an output raster image are obtained from a structured image template. Image processing operations and the order of said operations within an image processing definition are stored within the SID. Unbound structured image references to undefined component objects and incomplete structured image references to image processing operations and parameters not explicitly defined within said structured image are determined. A template is generated based on the unbound and incomplete structured image references wherein the template contains pre-rendering code for the structured image. Information within the template is compiled into a SID language (SIDL) and code is developed automatically utilizing a modified structured image render program which analyzes said SIDL. The code can be used for future rendering or code modification activities. SID files are small in comparison to the code generated, and in plain text so they could be distributed to users of the system by electronic mail quickly. A complete image processing package could consist of the base library, a code generator and a set of SID files that could be expanded on the host system. Since SID files are machine independent text descriptions. An SID written on a Sun workstation could be converted to code on a Mac or PC, with the writing of code generators for each platform. Near zero development time for custom processing modules, with the performance of hand coding. An interactive editor, modified to create these special incomplete unbound SID files, would allow an end user or a solution center to supply custom code in minutes.

Referring back to FIG. 1, SI code generation can be implemented on a conventional hardware system 100 which includes a microprocessor 110 for receiving signals from, and outputting signals to, various other components of system 100 according to one or more software programs run on a microprocessor 110. A user input device 120 such as, a mouse, a keyboard, a touchscreen and/or combinations thereof is provided for permitting an operator to interface with SIs by, for example, supplying control signals thereto. An image output device 130, such as, a video display monitor, or a printer can be provided for outputting SI data. An SI input device 140, such as, a scanner can be provided for scanning images which are then stored in memory as image sources. Image sources can also be supplied from, for example, disks.

The microprocessor 110 includes a read-only memory (ROM) 150 for storing operating programs and image data, used by SI to construct and edit images. A random access memory (RAM) 160 is provided for running the various operating programs and additional files 170 can be provided for RAM overflow.

Figure 25:
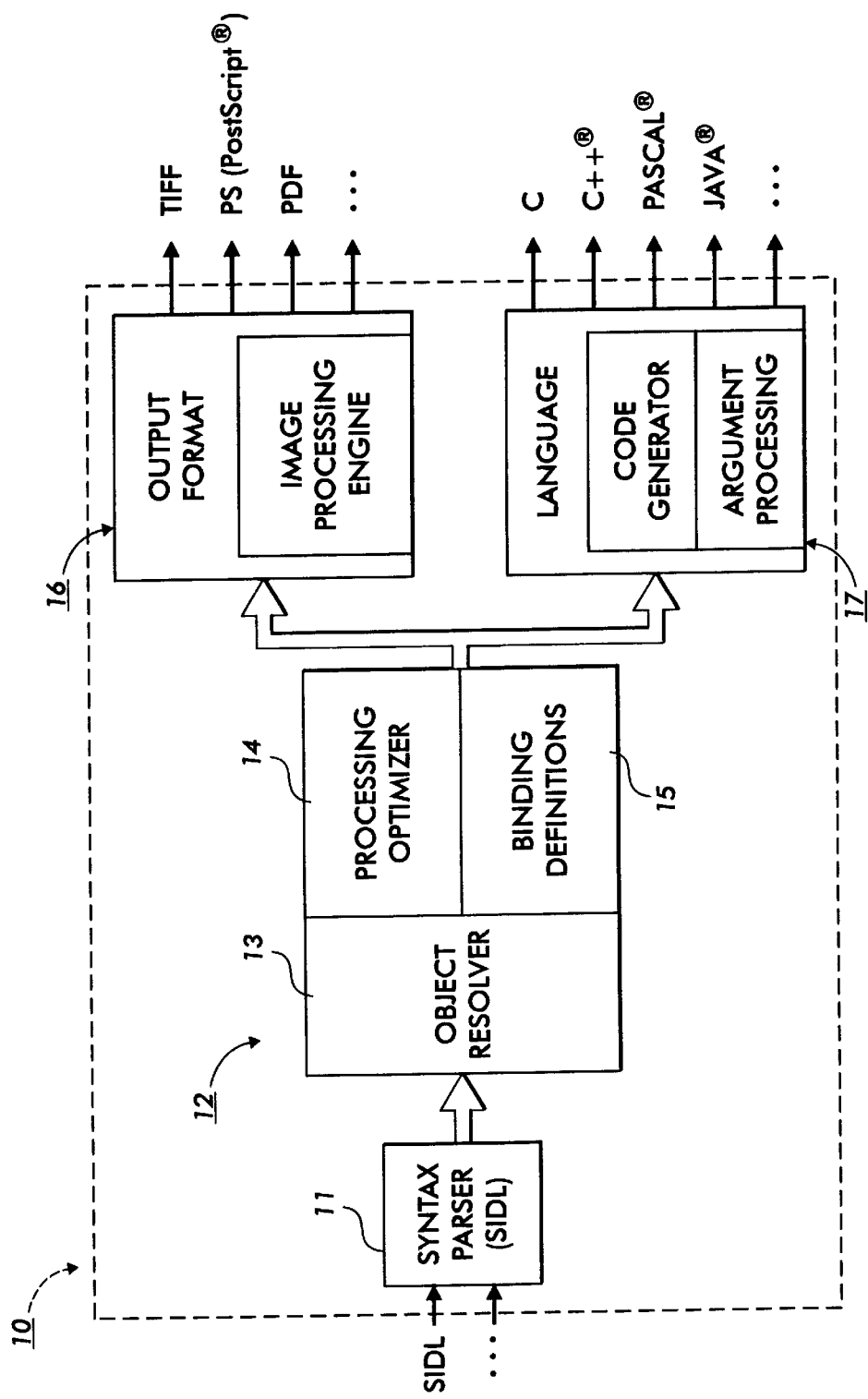
FIG. 25 illustrates a block diagram of the SI code generator circuitry.

Referring to FIG. 25, a block diagram of the system for generating SIs, and more importantly, for generating code is presented. The SI Renderer and Code Generator 10 is embodied within the microprocessor (shown in FIG. 1 as 110) and described above. SIDL enters the language interpreter 11 where SIDL is read and converted into symbol tables. The symbol tables then enter the processing section 12 where an object resolve 13 finds all the objects within the symbol tables and the SI information is processed and optimized through the processing optimize 14, and unbound/incomplete parameters are collated within the binding definition section 15. The final section of the system 10 has two components that SI information is feed into. The first component is the image processing and output section 16 where the SI output is produced in the proper format (e.g., TIFF, PostScript®, PDF, etc.). The second section of the system is the code generating section 17. SI information will enter the code generation section 17 where SI code and necessary arguments are generated and compiled into the relevant language (e.g. C, C++®, Pascal®, Java®, etc.)

As described in the method above, the structured image definition also includes interconnected image processing operations performed on the structured image objects which are merged into the structured image to form the structured image that is rendered. The microprocessor controls the means for constructing structured images and can be used to form and modify the structured image definition. The microprocessor reads the structured image from the constructing means and also interacts with the program for instantaneously generating structured image code. The program can instantaneously generate structured image code in response to computer instructions and operator inputted commands from the user interface. The resulting code is generated automatically based on structured image information read by the microprocessor.

The system can store the newly generated code into memory devices as described above. The system can also be used to render the structured images and can do so through the microprocessor means or a remote microprocessor based on access means known in the art of the structured image code stored in memory.

G. EXAMPLE OF GENERATED SI CODE

Figure 26:
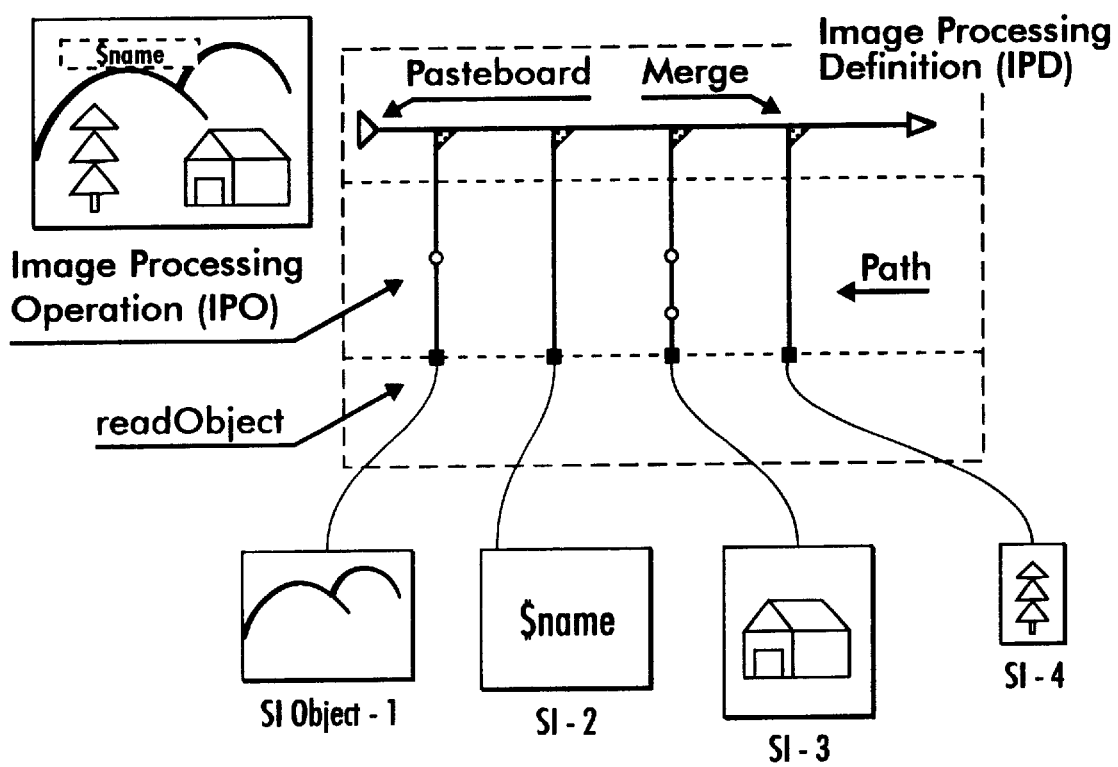
FIG. 26 is a graphic representation of an Image Processing Definition (IPD) as it relates to an output SI, which represents a structured description of references to component objects and Image Processing Operations (IPOs) applied to those component objects.

Referring to FIG. 26, a simple example of an SI operation is illustrated. During this operation mountains, text, a tree, and a house will be pasted to the pasteboard to create the resulting image shown as a sample in the upper left-hand side of the image. SI Object-1, the mountains, is read in first and will undergo an image processing operation (IPO) before it is merged with the other images and eventually attached to the pasteboard. SI-2 is unbound text that can be entered during processing, SI-3, the tree, is pasted third. Finally SI-4, the house will be pasted and will under go two IPOs Note that SI-1 will under an IPOs such as cropping and color enhancement before merger.

Referring to FIGS. 27 and 28, the SIDL relevant to this example is illustrated. Notice that the SIs are identified as Merge="$merge1", "$merge2", etc. The pasteboard is identified first with a DefaultWidth=7.0 in and height (AspectRatio)=1.0, and DefaultResolution=300. The first object for merger is identified "merge1"having a MergePoint=0.0 0.0, and Size=1.0 1.0. The Data is defined here as "mount.tif"with an image processing operation "IPO=Enhance". The second object is undefined or "unbound" and is merely referred to as "$name" which means that the text for this object becomes an argument to the code and can be keyed in by the user during processing. The text will have a MergePoint=0.1 0.1 and Size=0.5 0.1. The third object is identified as "$image" which is also unbound and will become an argument to the code. For purposes of this example the image will be a house which has a size of 0.4 0.4 and a MergePoint 0.5 0.5, but could be any other image selected during processing. The final object is identified as "pine_tree.tif" with a MergePoint=0.25 0.45 and a size=0.2 0.5. The above-described structured image was processed through the SI code generator and computer-generated source code was produced. The resulting code is set forth in Table 1 below.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

TABLE 1

| | |
|---|---|
| NOTICE: | Copyright 1997, Xerox Corporation<br>All Rights Reserved<br>Contained proprietary information of Xerox Corporation<br>and is protected under the copyright laws as an unpublished work. |
| DESCRIPTION: | Automatically generated Structured Image source code<br>using a Structured Image Processing Code Generator. |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

/*

TABLE 1-continued

```
**
** Computer-generated source code
**
** Generated from SI Code Generator
**
** COMPUTER GENERATED CODE - DO NOT MODIFY
*/
#include <stdio.h>
#include <stdarg.h>
#include <siren.h>
#include <si_code_gen.h>
/*
** Image processing-specific include
**
** Current code generation is based on XTIP
** In the future, the back-end code generator may be modified
** to use an instantiation abstraction to support arbitrary
** image processing systems.
*/
#include <xtip_int.h>
/*
** define usage and format statements
*/
#define USAGE "SICodeGenEx: -image file - name string"
#define FORMAT "@images:s @name:s"
/*
** what are input arguments
** i.e, which items are unbound or incomplete?
** These are global so all layers have equal access.
*/
int is_param_name;
char *param_name;
int is_param_image;
char *param_image;
/*
** Render SID procedures
** names for level of the tree, and number on level
*/
static Instance *SICDGN_sid_1_1(int, int);
static Instance *SICDGN_sid_2_1(int, int);
static Instance *SICDGN_sid_2_2(int, int);
static Instance *SICDGN_sid_2_3(int, int);
static Instance *SICDGN_sid_2_4(int, int);
/*
**
** Generated code
*/
int
main (int argc,char **argv)
   {
   Instance *ins;      /* image processing params   */
   int width;          /* image height    */
   int height;         /* image width     */
   int fdout = 1;      /* standard output     */
   /*
   ** read command-line arguments
   */
   scanargs(argc, argv,
      USAGE, FORMAT,
      &is_param_image, &param_image,
      &is_param_name, &param_name
      );
   /*
   ** how big is pasteboard?
   */
   width = 7.0 * 300;
   height = 1.0 * width;
   /*
   ** initialize top level sid
   */
   ins = SICDGN_sid_0_0(width, height);
   if (ins == NULL)
      XTAbort( );
   /*
   ** process image and output to standard output
   */
   if (XTProcessImage(ins, fdout) == XTERROR)
      XTAbort ( );
   }
```

TABLE 1-continued

```
/*
** initialize an SID reader
** level:1 item:1
*/
static Instance *
SICDGN_sid_1_1(int parent_width, int parent_height)
  {
  Instance *ins, *prim;
  char *argv[100];
  /* dimensions of sid */
  int width = 1.0 * parent_width;
  int height = 1.0 * parent_height;
  /* pasteboard params */
  int red, grn, blu;
  int x, y;
  /*
  ** pasteboard colors
  */
  SICDGN_colors("255 255 255", &red, &grn, &blue);
  /*
  ** instantiate pasteboard
  */
  ins = XTInitTask(init_pattern,
        "size", &width, &height,
        "constant", &red, &grn, &blue,
        ARG_END);
  if (ins == NULL)
     XTAbort( );
  prim = XTInitTask(init_nmerge,
        "link", ins,
        ARG_END);
  if (prim == NULL)
     XTAbort( );
  /*
  ** SID representation is an IPD
  ** process each merge
  */
  /* instantiate SID level:2 item:1 */
  ins = SICDGN_sid_2_1(width, height);
  if (ins == NULL)
     XTAbort( );
  /* instantiate image processing */
  XTBuildArgumentVector(argv,
        "link", ins,
        ARG_END);
  if ((ins = init_enchance(argv) == NULL)
     XTAbort( );
  /* instantiate merge */
  x = (int)(0.0 * (double)width);
  y = (int)(0.0 * (double)height);
  ins = XTInitTask(init_nmerge,
        "link", ins,
        "primary", prim,
        "offset", &x, &y,
        ARG_END);
  /* instantiate SID level:2 item:2 */
  ins = SICDGN_sid_2_2(width, height);
  if (ins == NULL)
     XTAbort( );
  /* instantiate processing */
  /* instantiate merge */
  x = (int)(0.2 * (double)width);
  y = (int)(0.2 * (double)height);
  ins = XTInitTask(init_nmerge,
        "link", ins,
        "primary", prim,
        "offset", &x, &y,
        ARG_END);
  /* instantiate SID level:2 item:3 */
  ins = SICDGN_sid_2_3(width, height);
  if (inst == NULL)
     XTAbort( );
  /*
  ** instantiate processing
  */
  /* Crop */
  XTBuildArgumentVector(argv,
        "link", ins,
        ARG_END);
```

TABLE 1-continued

```
    XTAppendArgumentVector(argv,"window",ARG_END);
    SICDGN_Append_Dbl_Arg(argv,0.2);
    SICDGN_Append_Dbl_Arg(argv,0.0);
    SICDGN_Append_Dbl_Arg(argv,0.8);
    SICDGN_Append_Dbl_Arg(argv,0.7);
    (if ((ins = init_crop(argv)) == NULL)
       XTAbort( );
    /* ColorAdjust */
    XTBuildArgumentVector(argv,
          "link", ins,
          ARG_END);
    XTAppendArgumentVector(argv,"hue",ARG_END);
    SICDGN_Append_Dbl_Arg(argv,0.9);
    XTAppendArgumentVector(argv,"chroma",ARG_END);
    SICDGN_Append_Dbl_Arg(argv,0.5);
    if ((ins = init_colormod(argv)) == NULL)
       XTAbort( );
    /* instantiate merge */
    x = (int)(5.0 * (double)width);
    y = (int)(0.5 * (double)height);
    ins = XTInitTask(init_nmerge,
          "link", ins,
          "primary", prim
          "offset", &x, &y,
          ARG_END);
    /* instantiate SID level:2 item:4 */
    ins = SICDGN_sid_2_4(width, height);
    if (ins == NULL)
       XTAbort( );
    /* instantiate image processing */
    /* instantiate merge */
    x = (int)(0.25 * (double)width);
    y = (int)(0.45 * (double)height);
    ins = XTInitTask(init_nmerge,
          "link", ins,
          "primary", prim,
          "offset", &x, &y,
          ARG_END);
    return ins;
    }
/*
** initialize an SID reader
** level 2 item 1
*/
static Instance *
SICDGN_sid_2_1(int parent_width, parent_height)
    {
    Instance *ins, *prim;
    char *argv[100];
    /* dimensions of sid */
    int width = 1.0 * parent_width;
    int height = 1.0 * parent_height;
    /*
    ** pasteboard unspecified
    */
    /*
    ** SID representation is an Raster
    ** load image
    */
    if ((ins = XTSource(0, "mount.tif")) == NULL)
       XTAbort( );
    /*
    ** scale image
    */
    ins = XTInitTask(init_scale,
          "link", ins,
          "window", &width, &height,
          ARG_END);
    if (ins == NULL)
       XTAbort( );
    return ins;
    }
/*
** initialize an SID reader
** level 2 item 2
*/
static Instance *
SICDGN_sid_1_1(int parent_width, parent_height)
    {
```

TABLE 1-continued

```
  Instance *ins, *prim;
  char *argv[100];
  /* dimensions of sid */
  int width = 0.5 * parent_width;
  int height = 0.1 * parent_height;
  /*
  ** pasteboard unspecified
  */
  /*
  ** SID representation is an ToyText
  ** load image
  */
  ins = XTIntTask(init_label,
        "string", param_name,
        "create", &width, &height,
        ARG_END);
    if (ins == NULL)
    XTAbort( );
  return ins;
}
/*
** initialize an SID reader
** level 2 item 3
*/
static Instance *
SICDGN_sid_5_5(int parent_width, parent_height)
  {
  Instance *ins, *prim;
  char *argv[100];
  /* dimensions of sid */
  int width = 0.4 * parent_width;
  int height = 0.4 * parent_height;
  /*
  ** pasteboard unspecified
  */
  /*
  ** SID representation is an Raster
  ** load image
  */
  if ((ins = XTSource(0, param_image)) == NULL)
    XTAbort( );
  /*
  ** scale image
  */
  ins = XTInitTask(init_scale,
        "link", ins,
        "window", &width, &height,
        ARG_END);
  if (ins == NULL)
    XTAbort( );
  return ins;
  }
/*
** initialize an SID reader
** level 2 item 4
*/
static Instance *
SICDGN_sid_2_4(int parent_width, parent_height)
  {
  Instance *ins, *prim;
  char *argv[100];
  /* dimensions of sid */
  int width = 0.2 * parent_width;
  int height = 0.5 * parent_height;
  /*
  ** pasteboard unspecified
  */
  /*
  ** SID representation is an Raster
  ** load image
  */
```

TABLE 1-continued

```
if ((ins = XTSource(0, "pine_tree.tif")) == NULL)
   XTAbort( );
/*
** scale image
*/
ins = XTInitTask(init_scale,
      "link", ins,
      "window", &width, &height,
      ARG_END);
if (ins == NULL)
   XTAbort( );
return ins;
}
*******************************END***************************
```

What is claimed is:

1. A method for generating re-editable image processing code, suitable for use in a programmable processor, from structured images by utilizing unbound and incomplete features of said structured images, comprising:

a) obtaining from a structured image, nested sub-component references and associated image processing operations necessary to generate an output raster image;

b) storing image processing operations and an order of said operation within an image processing definition;

c) determining unbound structured image references to undefined component objects;

d) determining incomplete structured image references to image processing operations and parameters not explicitly defined within said structured image;

e) storing said structured image in a memory for manipulation of said structured images through pre-rendering code techniques; and f) developing a completed source code program utilizing a modified structured image render program which analyzes said structured image and converts said structured image into said completed source code program wherein operational documentation can be supplied by an operator at document creation time with low level reference added automatically by said code generator based on what calls were assembled.

* * * * *